(12) United States Patent
Lavoie et al.

(10) Patent No.: US 10,766,525 B2
(45) Date of Patent: Sep. 8, 2020

(54) ENHANCED YAW RATE TRAILER ANGLE DETECTION INITIALIZATION

(71) Applicant: Ford Global Technologies, LLC, Dearborn, MI (US)

(72) Inventors: Erick Michael Lavoie, Dearborn, MI (US); Donald Jacob Mattern, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 16/130,277

(22) Filed: Sep. 13, 2018

(65) Prior Publication Data

US 2019/0009815 A1   Jan. 10, 2019

Related U.S. Application Data

(63) Continuation-in-part of application No. 15/200,835, filed on Jul. 1, 2016, now Pat. No. 10,106,193.

(51) Int. Cl.

| | |
|---|---|
| *B62D 6/00* | (2006.01) |
| *B62D 13/06* | (2006.01) |
| *B60W 40/114* | (2012.01) |
| *B60W 40/105* | (2012.01) |
| *B62D 15/02* | (2006.01) |

(52) U.S. Cl.
CPC ........... *B62D 6/005* (2013.01); *B60W 40/105* (2013.01); *B60W 40/114* (2013.01); *B62D 6/00* (2013.01); *B62D 13/06* (2013.01); *B62D 15/027* (2013.01); *B60W 2300/14* (2013.01); *B60W 2520/22* (2013.01); *B60W 2540/18* (2013.01)

(58) Field of Classification Search
CPC ........ B62D 6/005; B62D 15/027; B62D 6/00; B62D 13/06; B60W 40/105; B60W 40/114; B60W 2520/22; B60W 2540/18; B60W 2300/14
See application file for complete search history.

(56) References Cited

U.S. PATENT DOCUMENTS

| | | | |
|---|---|---|---|
| 2008/0177454 A1* | 7/2008 | Bond et al. | ........... B60T 8/1708 701/70 |
| 2013/0179038 A1* | 7/2013 | Goswami | ............. B62D 13/005 701/42 |
| 2013/0231825 A1* | 9/2013 | Chundrlik, Jr. | ... B60W 50/0098 701/29.1 |
| 2013/0261843 A1* | 10/2013 | Kossira | ................. B60T 8/1708 701/1 |
| 2014/0277941 A1* | 9/2014 | Chiu | ...................... B62D 13/06 701/41 |
| 2014/0288769 A1* | 9/2014 | Trombley | ............... G06F 17/00 701/34.4 |

(Continued)

*Primary Examiner* — Basil T. Jos
(74) *Attorney, Agent, or Firm* — Raymond Coppiellie; Price Heneveld LLP

(57) ABSTRACT

A trailer backup assist system for a vehicle reversing a trailer includes a sensor module adapted to attach to the trailer and generate a trailer yaw rate or a trailer speed. The trailer backup assist system also includes a vehicle sensor system that generates a vehicle yaw rate and a vehicle speed. Further, the trailer backup assist system includes a controller that estimates a hitch angle based on the trailer yaw rate or the trailer speed and the vehicle yaw rate and the vehicle speed in view of a kinematic relationship between the trailer and the vehicle.

20 Claims, 14 Drawing Sheets

(56) References Cited

U.S. PATENT DOCUMENTS

2014/0343795 A1\* 11/2014 Lavoie .................. B62D 13/06
                                                701/42
2016/0203721 A1\*  7/2016 Wright .................... H04N 7/18
                                                348/118

\* cited by examiner

ENHANCED YAW RATE TRAILER ANGLE DETECTION INITIALIZATION

This application is a Continuation-In-Part of U.S. patent application Ser. No. 15/200,835, filed Jul. 1, 2016, now U.S. Pat. No. 10,106,193, and entitled "ENHANCED YAW RATE TRAILER ANGLE DETECTION INITIALIZATION." The above-identified patent application is hereby incorporated herein in its entirety.

FIELD OF THE INVENTION

The disclosure made herein relates generally to vehicles including trailer backup assist systems, and more particularly to trailer identification and hitch angle estimation for a trailer at vehicle start-up.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer may estimate the position of the trailer relative to the vehicle utilizing a yaw rate sensor and an algorithm that calculates a hitch angle from yaw rate data.

SUMMARY OF THE INVENTION

A vehicle including a trailer backup assist system includes an authentication device that permits vehicle operation if the authentication device is actuated to an ON state from an OFF state. The authentication device may comprise a conventional ignition key cylinder that is actuated utilizing a key, or the authentication device may comprise a wireless device that provides an authentication code or other security measures. The vehicle also includes a sensor or other feature that is configured to indicate whether or not a trailer is attached to the vehicle. The sensor may comprise a switch that provides a signal to the trailer backup assist system if a trailer is connected to the vehicle. The vehicle further includes a controller configured to store trailer data, a vehicle position, and hitch angle if the authentication device changes from an ON state to an OFF state to define a power off event. The controller is also configured to determine if the authentication device is changed from an OFF state to an ON state to define a power on event. The controller is also configured to determine if a trailer is connected to the vehicle if a power on event occurs. The controller also determines if a present position of the vehicle has changed since a power off event. If a present position of the vehicle has not changed, the controller is configured to retrieve at least one of trailer data and hitch angle for use in the trailer backup assist system. If a present position of the vehicle has changed since a power off event, the controller provides an indication to a user that trailer data needs to be supplied to the trailer backup assist system.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
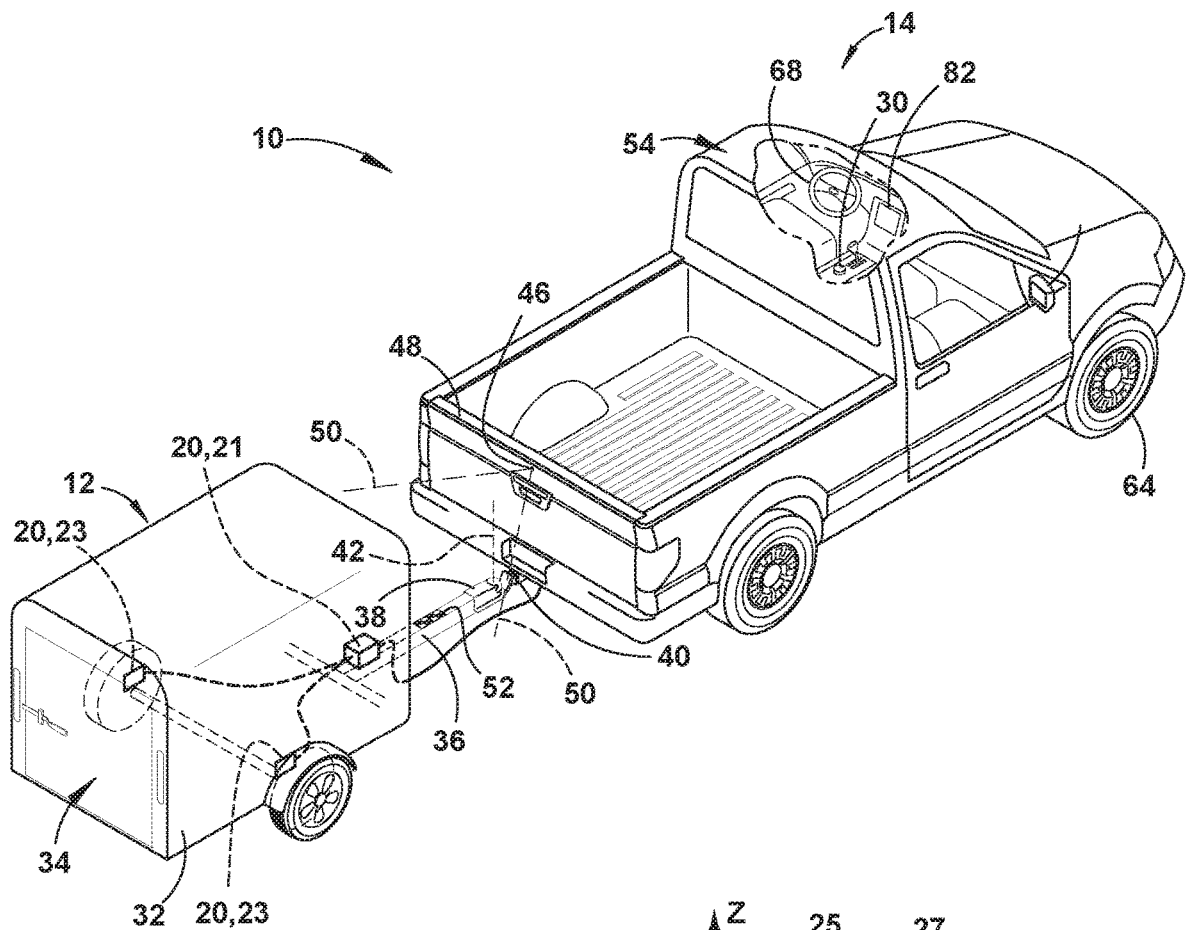
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As discussed in more detail below, the system and method 200 of FIG. 13 may be utilized in connection with the system and processes of FIGS. 1-12 at vehicle start-up to identify a trailer and retrieve trailer data and/or to provide an initial hitch (trailer) angle at vehicle start up.

The present application is related to U.S. Pat. No. 9,610,975, entitled "HITCH ANGLE DETECTION FOR TRAILER BACKUP ASSIST SYSTEM," issued on Apr. 4, 2017, U.S. Pat. No. 9,156,496, entitled "VEHICLE TRAILER ANGLE DETECTION SYSTEM AND METHOD," issued on Oct. 13, 2015, U.S. Pat. No. 10,000,207 entitled "VEHICLE HITCH DETECTION SYSTEM AND METHOD," issued on Jun. 19, 2018, U.S. Pat. No. 9,827,818, entitled "MULTI-STAGE SOLUTION FOR TRAILER HITCH ANGLE INITIALIZATION," issued on Nov. 28, 2017, U.S. Pat. No. 9,821,845, entitled "TRAILER LENGTH ESTIMATION METHOD USING TRAILER YAW RATE SIGNAL," issued on Nov. 21, 2017, U.S. Pat. No. 8,068,019, entitled "TRAILER IDENTIFICATION SYSTEM," issued on Nov. 29, 2011, U.S. Pat. No. 9,037,349, entitled "TRAILER IDENTIFICATION SYSTEM FOR TRAILER BACKUP ASSIST," issued on May 19, 2015, U.S. Pat. No. 9,340,228, entitled "TRAILER MOTION AND PARAMETER ESTIMATION SYSTEM," issued on May 17, 2016, U.S. Pat. No. 9,315,212, entitled "TRAILER SENSOR MODULE AND ASSOCIATED METHOD OF WIRELESS TRAILER," issued on Apr. 19, 2016, U.S. Pat. No. 9,102,271, entitled "TRAILER MONITORING SYSTEM AND METHOD," issued on Aug. 11, 2015, the entire contents of each being incorporated herein by reference.

Referring to FIGS. 1-12, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle $\gamma$ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle $\gamma$. Accordingly, one embodiment of a sensor module 20 is adapted to attach to the trailer 12 and generate a trailer yaw rate $\omega_2$. Sensor module 20 may be secured to tongue 36 of trailer 12 utilizing a connector 20A (FIG. 1A). Connector 20A may comprise a magnet, a bracket, threaded fasteners, straps, U-bolts, or other suitable fastener. The trailer backup assist system 10 according to such an embodiment may also include a vehicle sensor system 17 that generates a vehicle yaw rate $\omega_1$ and a vehicle speed $v_1$. The controller 28 of the trailer backup assist system 10 may thereby estimates a hitch angle $\gamma$ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may include a hitch angle sensor 44, such as a vision-based system that employs a camera 46 on the vehicle 14 to monitor a target 52 on the trailer 12 to determine the hitch angle $\gamma$ and thereby further increase reliability of the overall estimated hitch angle $\gamma$.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle $\gamma$ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

Figure 1A:
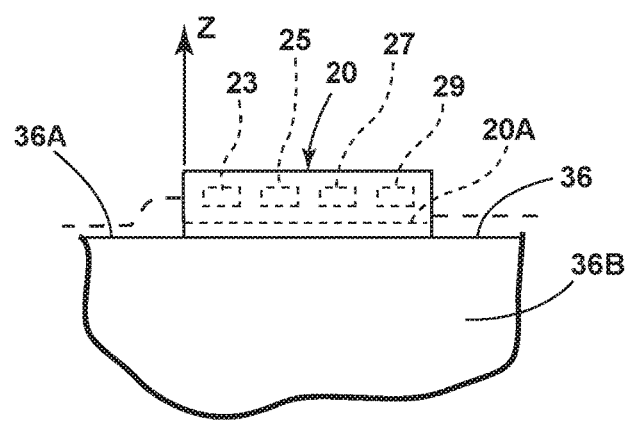
FIG. 1A is a partially fragmentary view of the trailer sensor module of FIG. 1.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle $\gamma$. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, a 2-axis inclinometer 29, and the wheel speed sensors 23. Accordingly, in the illustrated embodiment, the yaw rate sensor 25 and the accelerometer 27 are contained within the housed sensor cluster 21, although other configurations are conceivable. As discussed below, the inclinometer provides data concerning the angle (orientation) of the sensor module 20 and sensor cluster 21, including yaw rate sensor 25. This incline data may be used to determine if the yaw rate sensor 25 is properly mounted on trailer 12.

It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilizes processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
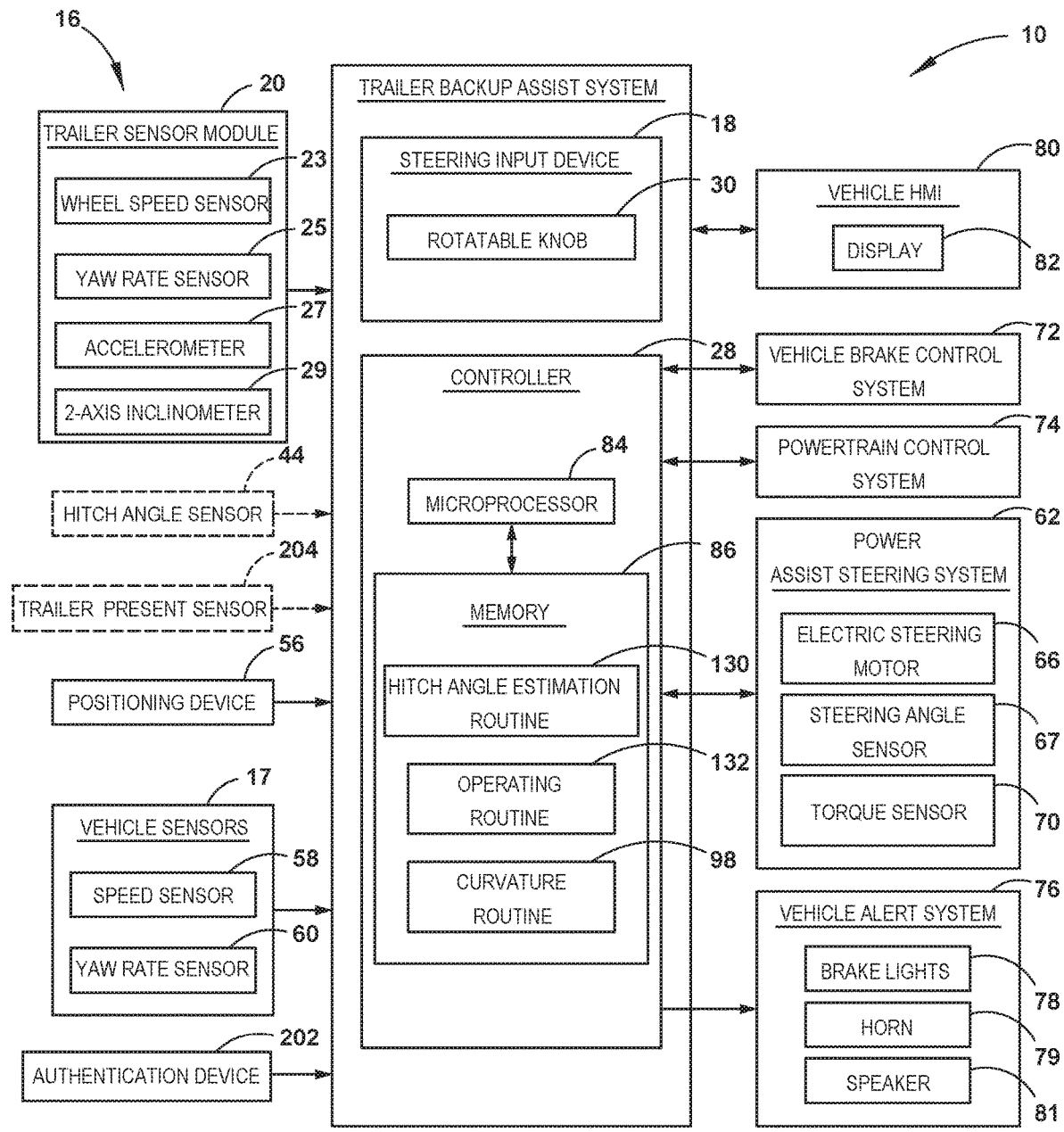
FIG. 2 is a block diagram illustrating one embodiment of the trailer backup assist system having a steering input device, a curvature controller, and a trailer braking system.

In general, sensor module 20 may be installed on trailer 12, and the sensor module 20 may remain on the trailer 12 after trailer 12 is disconnected from vehicle 14. Alternatively, if connector 20A (FIG. 1A) comprises a magnet or other releasable arrangement, the sensor module 20 may be installed and removed from trailer 12 and/or other trailers as required. Trailer yaw rate sensor 25 is configured to detect rotation and/or rotation rate about a vertical (z) axis. The trailer sensor module may be mounted to an upper surface 36A (FIG. 1A) of tongue 36 of trailer 12 utilizing a connector 20A, which may comprise a magnet 20 or other suitable connector. Yaw rate sensor 25 may not provide accurate data if the yaw rate sensor 25 is not properly oriented with respect to the horizontal plane (i.e. x-y plane). In order to ensure that the yaw rate sensor 25 is properly mounted, trailer sensor module 20 may optionally include a 2-axis inclinometer 29 (FIG. 2). The inclinometer 29 provides data concerning the orientation of the trailer sensor module 20, and in particular, provides data concerning the orientation of yaw rate sensor 25. Data from the inclinometer 29 and vehicle sensors permits verification that yaw rate sensor 25 is properly mounted within tolerance for proper orientation. The system may be configured to establish that each axis of inclinometer 29 is within acceptable limits, and data from the inclinometer 29 may be compared with available vehicle data to ensure that the trailer 12 and vehicle 14 are on the same plane (within tolerance). This prevents misalignment due to the trailer 12 being on a grade when the orientation takes place.

As discussed below in connection with FIG. 10, if improper installation is detected (i.e. yaw rate sensor 25 is mounted to trailer 12 at an orientation that is out of tolerance), text and/or graphics may be displayed on vehicle HMI 80 indicating to a user that a mounting error has occurred. The system may be configured to provide the user with a dynamic interface that provides direction as the trailer sensor module 20 is moved to an acceptable orientation. For example, the HMI 80 may comprise a display screen 82 that provides a user with information concerning the orientation of sensor module 20, and information concerning adjustments that are required to move sensor module 20 to the proper orientation. The attachment 20A (FIG. 1A) may include adjustment features (not shown) such as threaded members or other suitable arrangement to permit adjustment of the orientation of trailer sensor module 20 relative to the trailer 12.

The inclinometer 29 and adjustable/temporary attachment 20A eliminate sensor errors that could be caused by improper orientation of the sensor module 20 on trailer 12. Furthermore, this arrangement also permits a single trailer sensor module 20 to be mounted on various trailers used in connection with vehicle 14, thereby eliminating the need to have a separate sensor module 24 each trailer used with a particular vehicle 14. Data from inclinometer 29 may also be monitored by the trailer backup system to indicate improper mounting and to direct corrective action at all times with a sensor module 20 that is temporarily mounted to a trailer 12.

As discussed in more detail below in connection with FIG. 13, one or more of the sensors 23, 25, 27, 29 of sensor module 20 may transmit serial numbers and/or other unique identifying information to the trailer backup assist system 10 (e.g. controller 28) such that the trailer backup assist system can determine if trailer 12 is a "known" trailer and thereby identify a specific trailer 12. The trailer backup assist system 10 can then retrieve stored trailer data (e.g. trailer length, trailer type, etc.) for a specific trailer 12. If a particular vehicle 14 is regularly used to tow several different trailers 12, a sensor module 20 with unique serial numbers or other identifying code/information may be mounted on each trailer 12. Alternatively, a target 52 (FIG. 1) including unique identification information (e.g. a bar code) may be placed on each trailer 12 that is used with a specific vehicle 14 to thereby enable the trailer backup assist system 10 of the vehicle 14 to identify each trailer.

With reference to the embodiment of the trailer backup assist system 10 shown in FIG. 2, the hitch angle sensor 44 is provided in dashed lines to illustrate that in some embodiments it may be omitted when the trailer sensor module 20 is provided. The illustrated embodiment of the trailer backup assist system 10 receives vehicle and trailer status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

With reference to FIG. 2, vehicle 14 may include an authentication device 202. Authentication device 202 may comprise a conventional ignition key cylinder that provides an "ON" signal or state if a key is inserted and rotated to turn the vehicle on. Alternatively, authentication device 202 may comprise a wireless device that is configured to permit operation of vehicle 14 and provide an "ON" (vehicle power on) state if an authorized security code is received from a wireless transmitter (fob), smartphone, or other device. When a user turns off vehicle 14, authentication device 202 provides an "OFF" (vehicle power off) state. Actuating authentication device 202 to turn on vehicle 14 and change from an OFF state to an ON state provides a "KEY ON" (vehicle power turned on) event, and deactuation of authentication device 202 to turn off vehicle 14 changes the state from ON to OFF to provide a "KEY OFF" (vehicle power turned off) event. It will be understood that the terms "ON," "OFF," "KEY ON," and "KEY OFF" are not limited to any particular type of authentication device 202. Thus, a key is not required to provide "KEY ON" and "KEY OFF" events or states, and these terms are generally used to refer to conditions in which a vehicle is turned on/off and may also be authorized to permit vehicle operation. In general, vehicle 14 may be configured such that electrical power is supplied to system 10 when vehicle power is on, and electrical power is not supplied to system 10 when vehicle power is turned off. System 10 may be configured to operate when vehicle power is turned on and off as discussed in more detail below in connection with FIG. 13. As discussed in more detail below in connection with FIG. 13, signals/data from authentication device 202 may be utilized to control storage and/or retrieval of trailer data, trailer identification information, and other functions of system 10 at vehicle start-up and shut-down.

Vehicle 14 and/or trailer 12 may optionally include a sensor 204 that provides a signal to trailer backup assist system 10 indicating that a trailer 12 is connected to vehicle 14. Sensor 204 may comprise a switch or the like that is actuated to provide a TrailerConnected Flag=TRUE signal (see also FIG. 13) if a hitch ball 40 is received in coupler assembly 38. The trailer backup assist system may also be configured to determine if communication with one or more of sensors 23, 25, and 27 of trailer sensor module 20 has been established, and provide a TrailerConnected Flag=TRUE signal if communication has been established. If the trailer backup assist system is configured in this way, sensor 204 is not required. If a sensor 204 is utilized, the trailer backup assist system may be configured to generate an alert (e.g. a message on screen 82) if sensor 204 indicates that a trailer is connected but the trailer backup assist system is unable to establish communication with sensor module 20. For example, a message such as "trailer sensor module not operating properly" could be displayed on screen 82.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
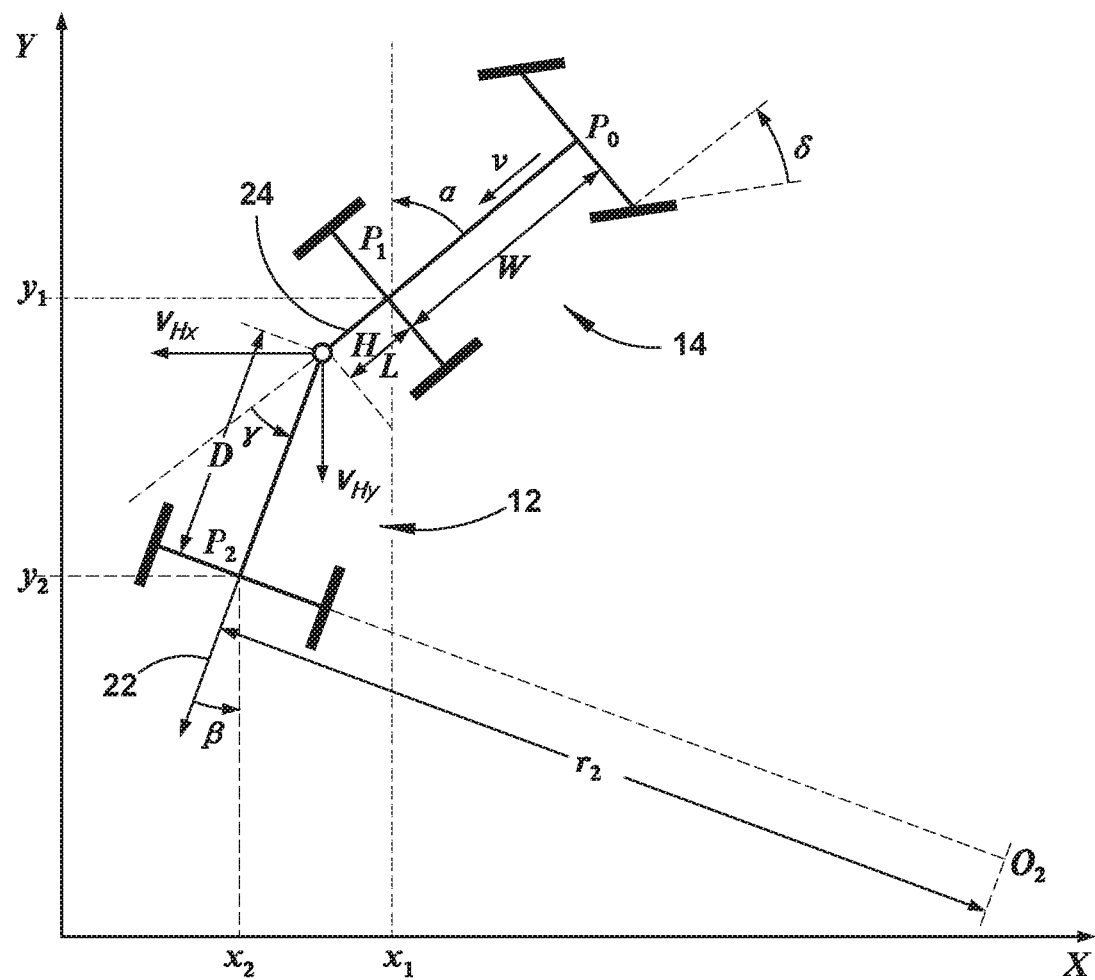
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

$\delta$: steering angle at steered front wheels of the vehicle;
$\alpha$: yaw angle of the vehicle;
$\beta$: yaw angle of the trailer;
$\gamma$: hitch angle ($\gamma=\beta-\alpha$);
$W$: wheel base of the vehicle;
$L$: drawbar length between hitch point and rear axle of the vehicle;
$D$: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle $\delta$ as a function of trailer path curvature $\kappa_2$ and hitch angle $\gamma$.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. The HMI 80 may include a touchscreen 82, buttons, and/or other input features that can be used by an operator to input trailer data (e.g. trailer length D) for a specific trailer 12. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14. As discussed below in connection with FIG. 13, a user may be prompted to enter trailer data at "KEY ON" if the trailer backup assist system detects that a "new" (unrecognized) trailer 12 is connected to vehicle 14. Alternatively, the system may automatically estimate the trailer angle and trailer parameters while the vehicle and trailer are driven without using the Trailer Backup Assist system. Otherwise, the user may be prompted to perform a calibration maneuver if the Trailer Backup Assist System is activated before sufficient driving is performed to estimate the trailer angle and trailer parameters.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
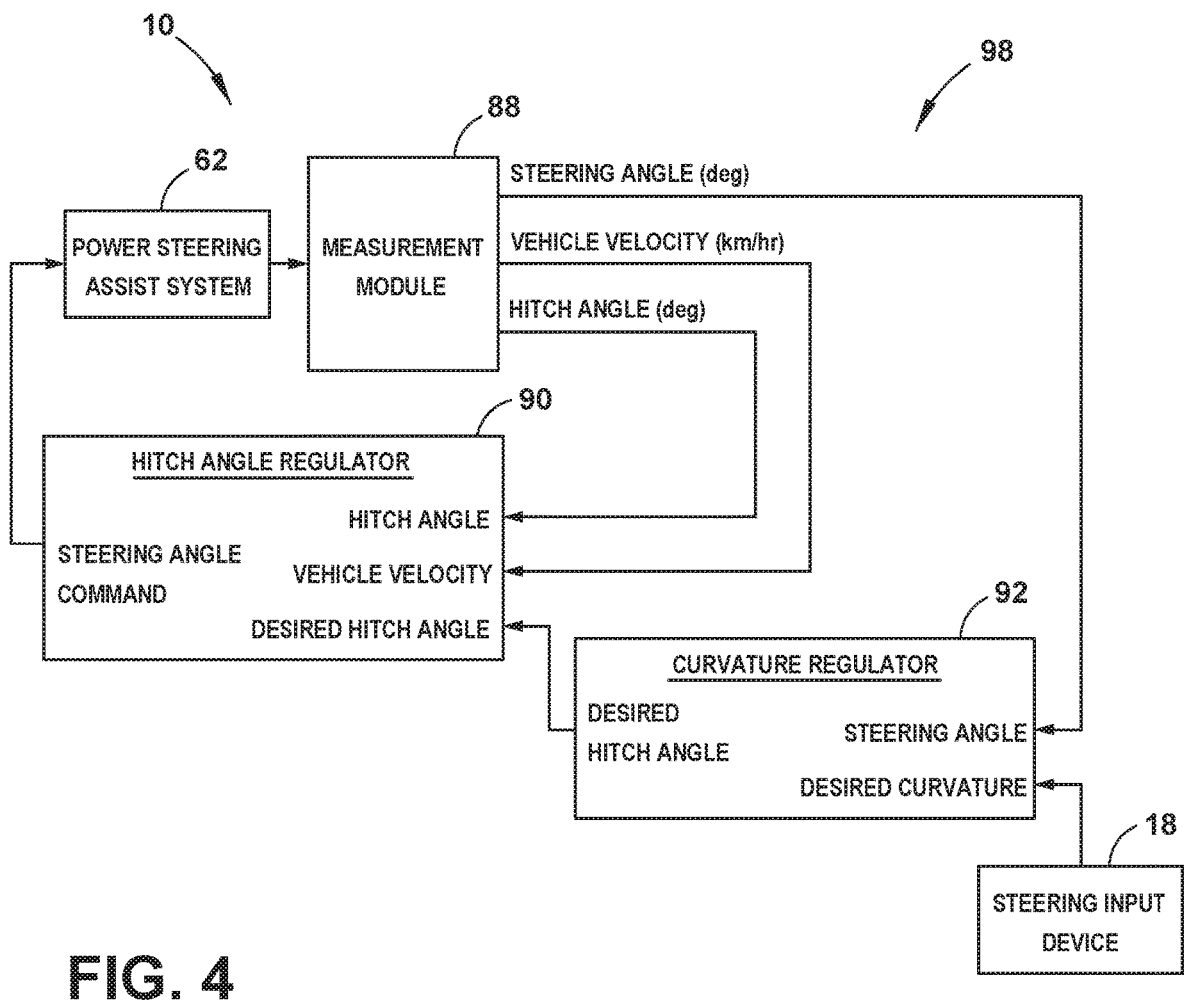
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle $\gamma(d)$ based on the current desired curvature $\kappa_2$ along with the steering angle $\delta$ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle $\gamma(d)$ is computed by the curvature regulator 92 the hitch angle regulator 90 generates a steering angle command based on the computed desired hitch angle $\gamma(d)$ as well as a measured or otherwise estimated hitch angle $\gamma(m)$ and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 5:
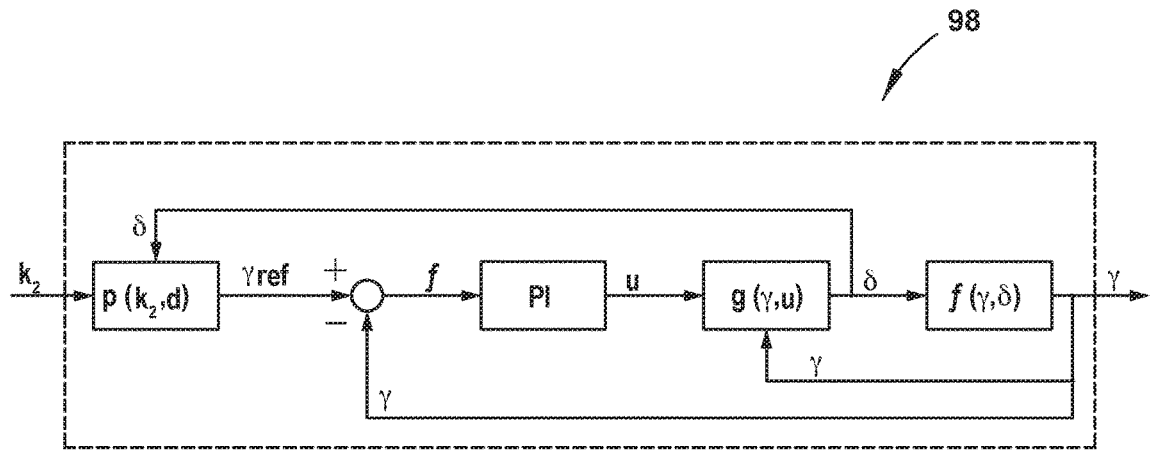
FIG. 5 is schematic block diagram of the curvature controller of FIG. 4, showing the feedback architecture and signal flow of the curvature controller, according to such an embodiment.

As also shown in FIG. 5, the embodiment of the curvature routine 98 shown in FIG. 4 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

$\delta$ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

With further reference to FIG. 5, the output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

As also shown in FIG. 5, the feedback control law, $g(u, \gamma, v)$, is implemented with a proportional integral (PI) controller, whereby the integral portion substantially eliminates steady-state tracking error. More specifically, the control system illustrated in FIG. 58 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller or otherwise determined by the trailer backup assist system 10, as disclosed in greater detail herein.

Figure 6:
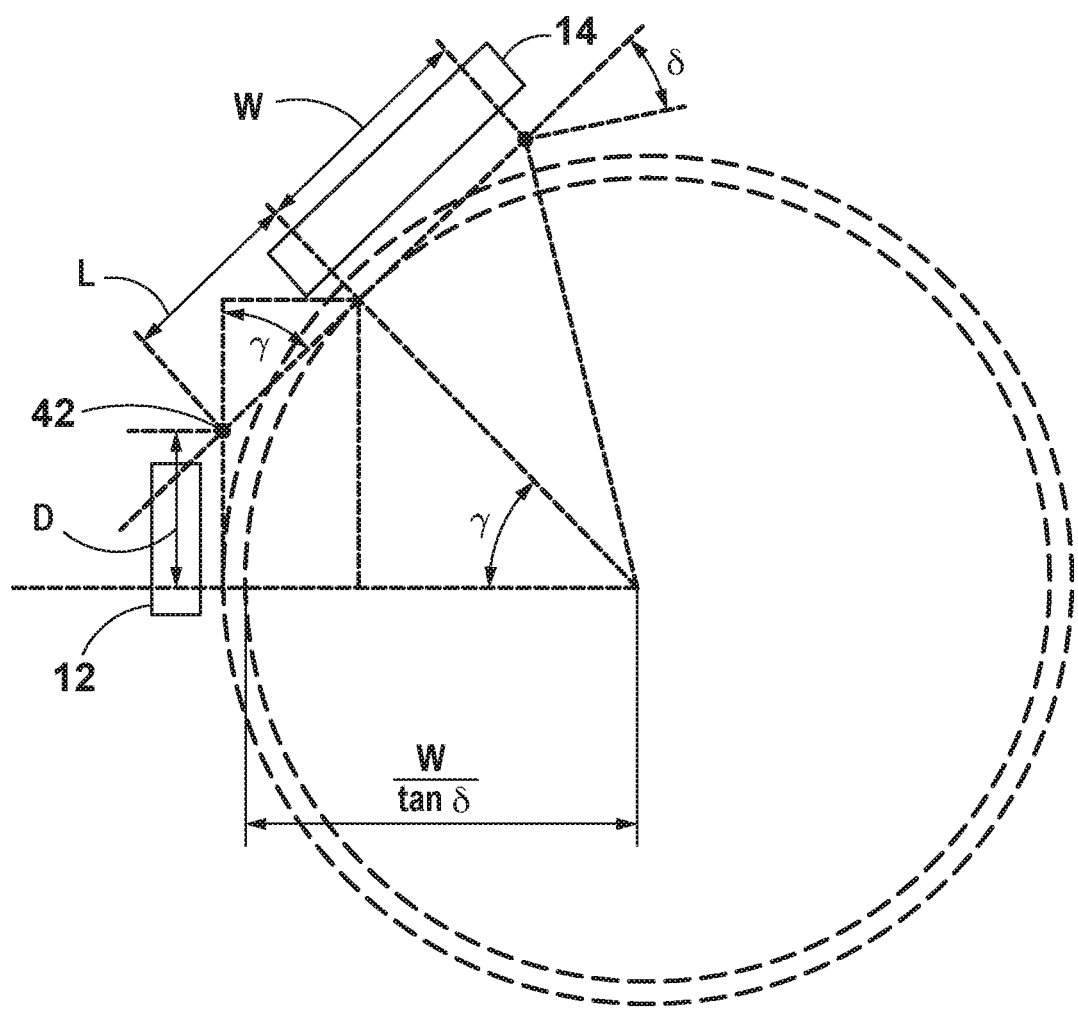
FIG. 6 is a schematic diagram showing a relationship between a hitch angle and a steering angle of the vehicle as it relates to curvature of the trailer and a jackknife angle.

Referring now to FIG. 6, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that while backing cannot be overcome by the maximum steering input for a vehicle such as, for example, the steered front wheels of the vehicle 14 being moved to a maximum steered angle $\delta$ at a maximum rate of steering angle change. The jackknife angle $\gamma(j)$ is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle γ for the vehicle 14 and the trailer 12 achieves or exceeds the jackknife angle γ(j), the vehicle 14 may be pulled forward to reduce the hitch angle γ. Thus, for limiting the potential for a vehicle/trailer system attaining a jackknife angle, it is preferable to control the yaw angle of the trailer 12 while keeping the hitch angle γ of the vehicle/trailer system relatively small.

A kinematic model representation of the vehicle 14 and the trailer 12 can also be used to determine a jackknife angle for the vehicle-trailer combination. Accordingly, with reference to FIGS. 3 and 6, a steering angle limit for the steered front wheels requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle δ(max). The steering angle for circular motion with hitch angle γ is defined by the following equation.

$$\tan\delta_{max} = \frac{W\sin\gamma_{max}}{D + L\cos\gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos\bar{\gamma} = \frac{-b \pm \sqrt{b^2 - 4ac}}{2a}$$

where,
a=$L^2 \tan^2 \delta(max)+W^2$;
b=2 LD $\tan^2 \delta(max)$; and
c=$D^2 \tan^2 \delta(max)-W^2$.

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 7:
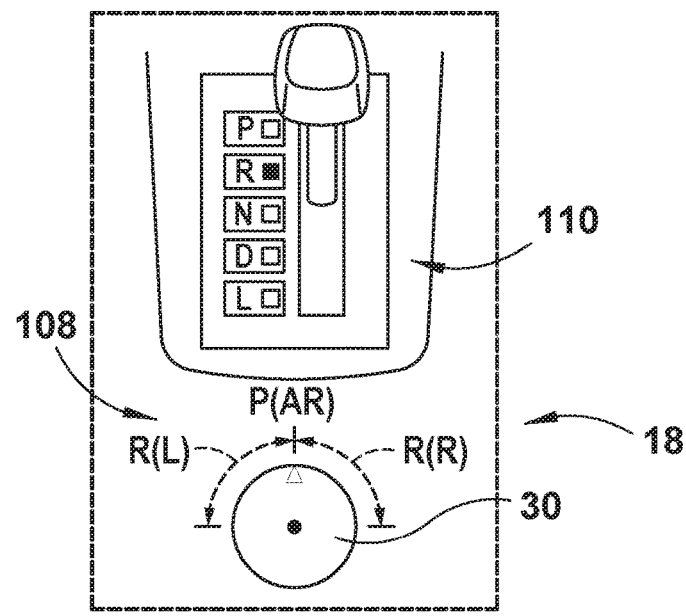
FIG. 7 is a plan view of a steering input device having a rotatable knob for operating the trailer backup assist system, according to one embodiment.

Referring now to FIG. 7, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 8:
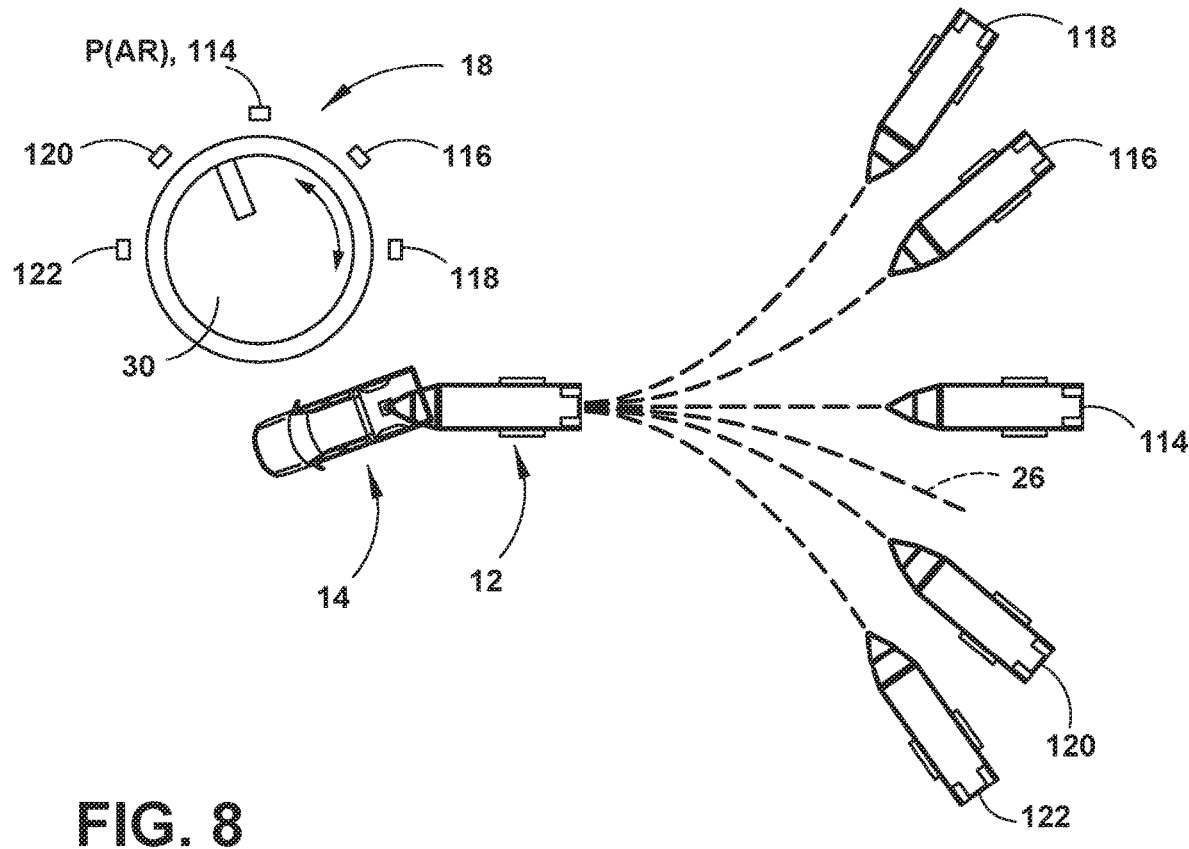
FIG. 8 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 7-8, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the controller 28. The at-rest position P(AR) of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 8, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 9:
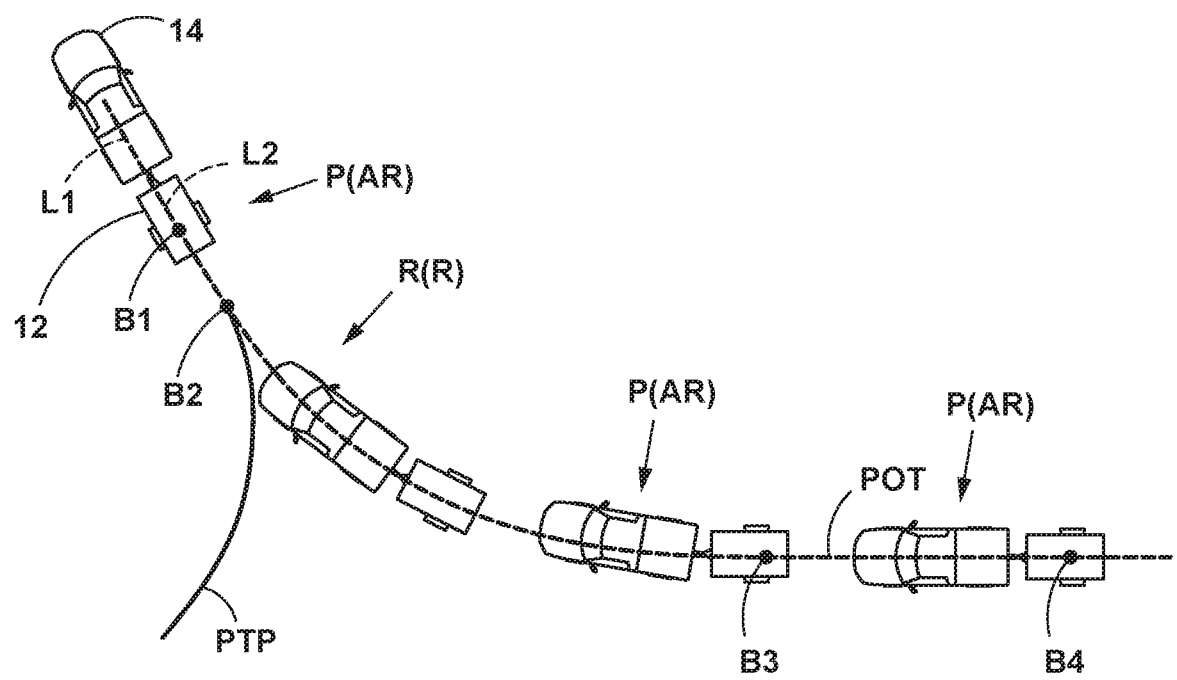
FIG. 9 is a schematic diagram showing a backup sequence of a vehicle and a trailer implementing various curvature selections with the trailer backup assist system, according to one embodiment.

Referring to FIG. 9, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 9, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 10:
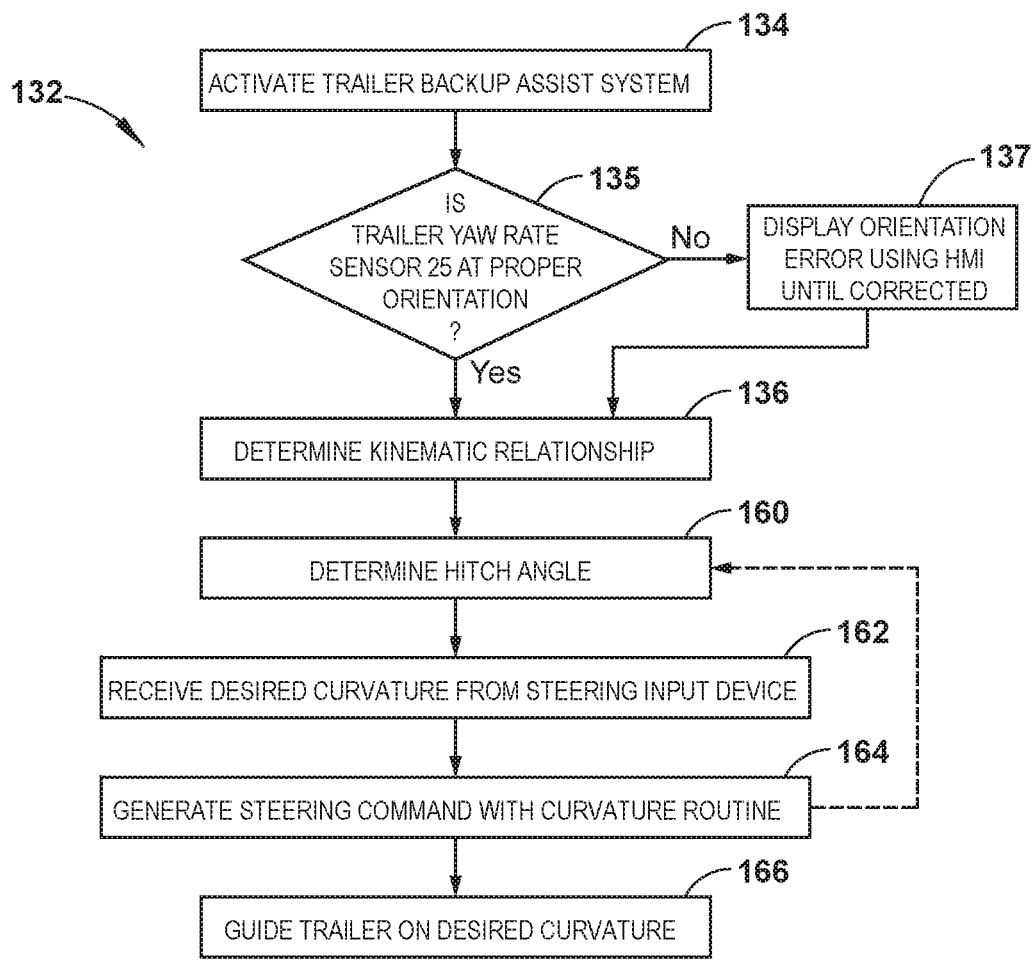
FIG. 10 is a flow diagram illustrating a method of operating a trailer backup assist system using an operating routine for steering a vehicle reversing a trailer with normalized control of the desired curvature, according to one embodiment.

With reference to FIG. 10, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such a making a selection on the display 82 of the vehicle HMI 80.

The operating routine 132 may optionally include steps 135 and 137. As discussed above in connection with FIGS. 1A and 2, the trailer sensor module 20 may optionally include a 2-axis inclinometer 29 that provides data concerning the orientation of the trailer sensor module 20, and in particular, the inclination of the yaw rate sensor 25. The yaw rate sensor 25 may be configured to measure yaw in one plane (i.e. the x-y plane). If the yaw rate sensor 25 of trailer sensor module 20 is not properly mounted on trailer 12, misalignment of the yaw rate sensor 25 relative to the x-y plane may lead to inaccuracy with respect to the data from yaw rate sensor 25.

Referring again to FIG. 10, at step 135, the proper sensor orientation of yaw rate sensor 25 is verified. If yaw rate sensor 25 is properly orientated, the process continues to step 136. However, if data from the 2-axis inclinometer 29 indicates that the yaw rate sensor 25 is not properly orientated, the process continues to step 137 and an orientation error is displayed utilizing a Human Machine Interface (HMI) 80 such as vehicle display 82 (FIGS. 1 and 2) until the orientation of the yaw rate sensor 25 is corrected. Step 137 may include providing instructions concerning the adjustments necessary to provide proper orientation of yaw rate sensor 25 (sensor module 20) on trailer 12. Steps 135 and 137 of measured yaw rate may optionally include comparison data to validity criteria to determine if yaw rate sensor 25 is properly oriented.

The next step 136, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle by processing the hitch angle estimation routine 130.

Figure 11:
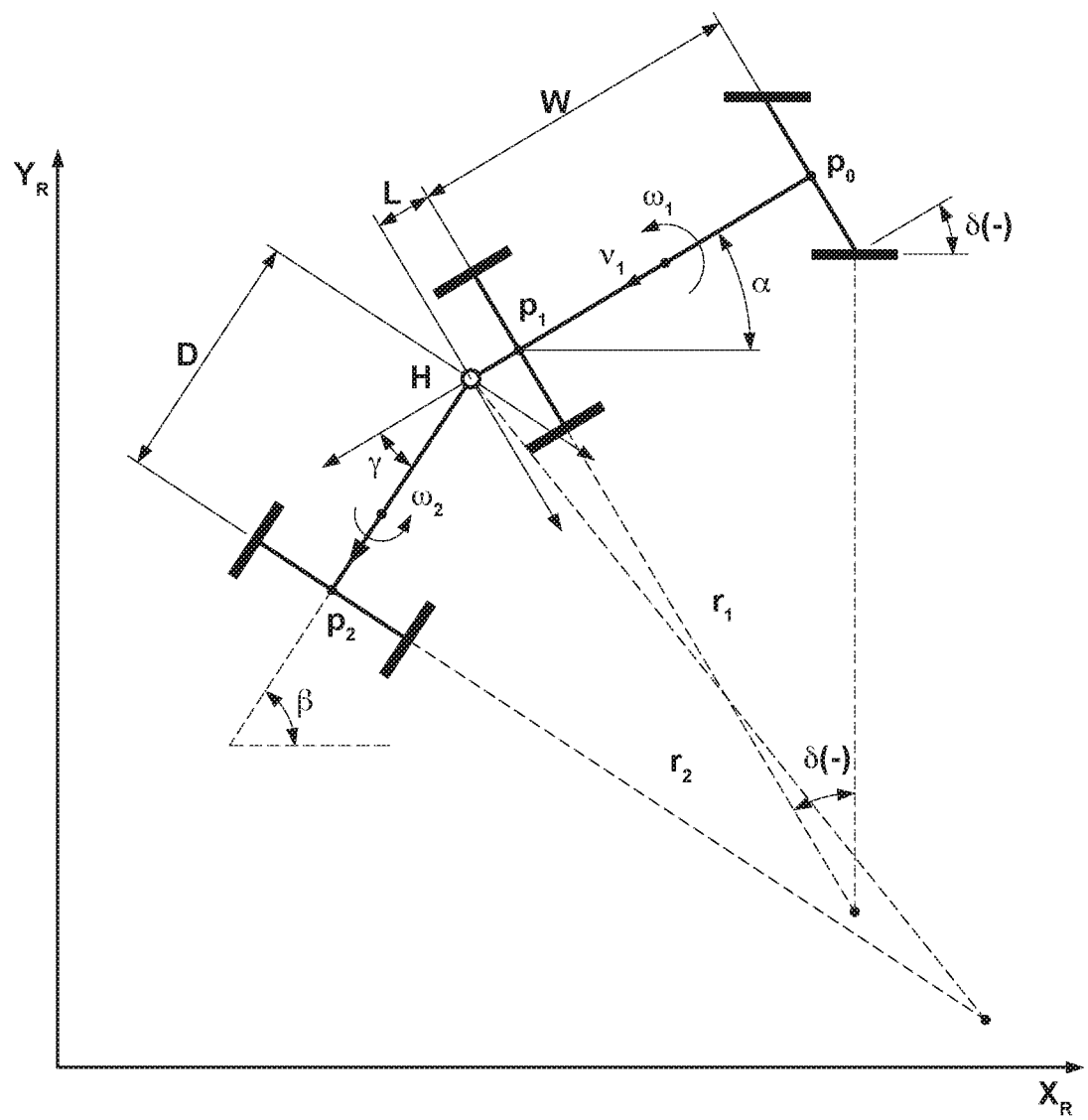
FIG. 11 is a schematic diagram that illustrates the geometry of a vehicle and a trailer overlaid with a two-dimensional x-y coordinate system, identifying variables used to determine a hitch angle, according to one embodiment.

As shown in FIG. 11, one embodiment of a kinematic relationship between the trailer 12 an the vehicle 14 is developed with the illustrated schematic diagram that shows the geometry of a vehicle and a trailer overlaid with a two-dimensional x-y coordinate system, identifying variables, such as the trailer yaw rate $\omega_2$ and the vehicle yaw rate $\omega_1$, which are used to determine the corresponding hitch angle γ. As such, hitch angle estimation may be determined using trailer yaw rate signal $\omega_2$, vehicle speed signal $v_1$ and vehicle yaw rate signal $\omega_1$. More specifically, the yaw rate of the trailer is given by the following kinematic equation:

$$\omega_2 = \frac{v_1}{D}\sin\gamma - \frac{L}{D}\cos\gamma\omega_1$$

This kinematic equation can be rearranged to estimate trailer hitch angle γ, as follows:

$$\gamma = \sin^{-1}\frac{v_1\omega_2 D + \omega_1 L\sqrt{v_1^2 + \omega_1^2 L^2 - \omega_2^2 D^2}}{v_1^2 + \omega_1^2 L^2} \text{ or}$$

$$\gamma = \sin^{-1}\frac{\omega_2 D}{\sqrt{v_1^2 + \omega_1^2 L^2}} + \tan^{-1}\frac{\omega_1 L}{v_1}$$

Figure 12:
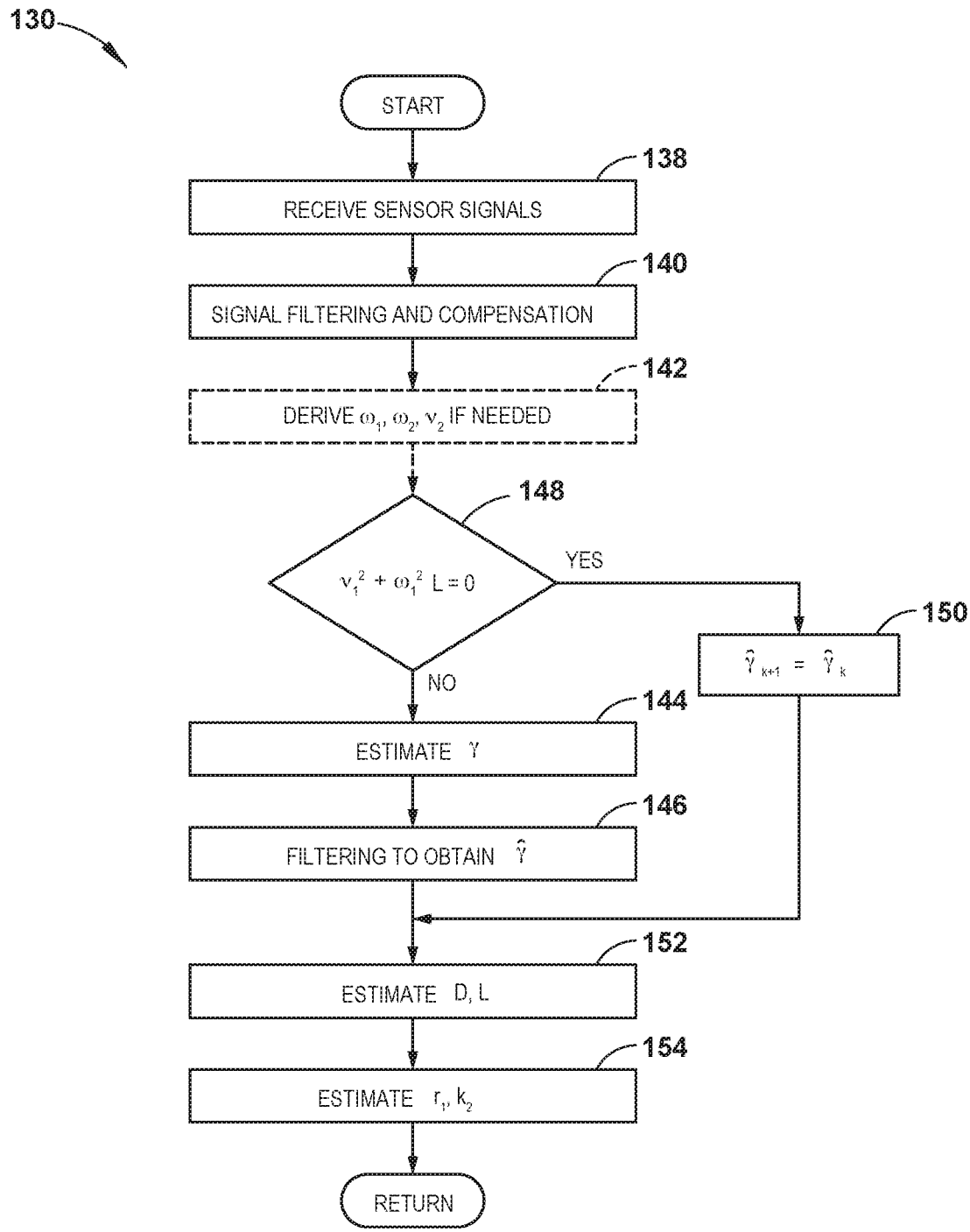
FIG. 12 is a flow diagram illustrating a method of estimating a hitch angle using a hitch angle estimation routine, according to one embodiment.

Referring to FIG. 12, one embodiment of the hitch angle estimation routine 130 is illustrated, whereby the above-noted kinematic relationship is utilized to instantaneously estimate the hitch angle γ. At step 138, the sensor signals are received for executing the steps to determine the hitch angle γ. The sensor signals may include the trailer yaw rate signal $\omega_2$, the vehicle speed signal $v_1$, and the vehicle yaw rate signal $\omega_1$, along with other sensor signals that may be used in some embodiments, such as the steering angle δ signal, trailer lateral acceleration $a_{y2}$, the measure hitch angle from the hitch angle sensor 44 among other potential sensor signals. At step 140, these signals may be filtered and any potential offsets may be compensated before proceeding to further process the sensor signals.

Still referring to FIG. 12, in one embodiment, the vehicle speed $v_1$ may be received from the speed sensor 58 on the vehicle 14 and not require any further processing or derivation to proceed with calculating the instantaneous hitch angle γ. However, at step 142, in some embodiments, the vehicle speed $v_1$ may be derived from wheel speed sensors on the vehicle 14, the positioning device 56, or other conceivable means to determine the vehicle speed $v_1$. Also, according to one embodiment, the vehicle yaw rate $\omega_1$ may be received directly from the yaw rate sensor 60 on the vehicle 14 and not necessitate any further derivation. However, it is also contemplated that at step 142, the vehicle yaw rate $\omega_1$ may additionally or alternatively be derived from left and right wheel speed sensors on the vehicle 14. Further, according to an additional embodiment, the vehicle yaw rate $\omega_1$ may be derived from the steering angle δ of the vehicle 14 and the vehicle speed $v_1$, along with the vehicle wheel-base W, which is known or otherwise stored in the memory 86 of the controller 28. One embodiment of an equation to determine the vehicle yaw rate $\omega_1$ based on the steering angle δ and the vehicle speed $v_1$ is as follows:

$$\omega_1 = \frac{v_1}{W}\tan\delta.$$

As shown in FIG. 12, the trailer yaw rate $\omega_2$ may also be provided directly by the sensor system 16 at step 138 or determined from processing the sensor signals at step 142. For instance, the trailer yaw rate $\omega_2$ may be received directly from the yaw rate sensor 25 mounted on the trailer 12. Additionally or alternatively, the trailer yaw rate $\omega_2$ may be derived from the left and right wheel speed sensors 23 on the trailer 12. Also, in addition or in the alternative, the trailer yaw rate $\omega_2$ may be calculated using the trailer speed $v_2$ and the lateral acceleration $a_{y2}$ of the trailer, as sensed by the accelerometer 27 of the trailer sensor module 20, in one embodiment. One embodiment of such an equation to determine the trailer yaw rate $\omega_2$ is as follows, where lateral acceleration $a_{y2}$ of the trailer may be derived from the accelerometer 27 and trailer speed $v_2$ may be derived from the wheel speed sensor 23:

$$\omega_2 = \frac{a_{y2}}{v_2}.$$

When wheel speed sensors 23 are not available or otherwise included on the trailer sensor module 20 or the sensor system 16, the above-referenced kinematic equation may then be reordered to solve for the trailer speed $v_2$, as follows:

$$v_1^2 + \omega_1^2 L^2 - D^2\omega_2^2 = (v_1 \cos \gamma + L \sin \gamma \omega_1)^2 = v_2^2, v_2 = \sqrt{v_1^2 + \omega_1^2 L^2 - D^2\omega_2^2}.$$

As such, the accuracy of the trailer speed $v_2$ and the resultant calculated hitch angle $\gamma$ will rely more heavily on the accuracy of the other sensors utilized to determine the vehicle speed $v_1$, vehicle yaw rate $\omega_1$, and the trailer yaw rate $\omega_2$, as previously mentioned, along with the accuracy of the vehicle and trailer dimensions L and D.

As illustrated in FIG. 12, when the sensor signals have been received and the necessary parameters received or otherwise determined, at step 144, the controller 28 processes the following equation, based on the kinematic relationship of the trailer 12 and the vehicle 14, to solve for the instantaneous hitch angle $\gamma$.

$$\gamma = \sin^{-1}\left(\frac{v_1\omega_2 D + \omega_1 L\sqrt{v_1^2 + \omega_1^2 L^2 - \omega_2^2 D^2}}{v_1^2 + \omega_1^2 L^2}\right)$$

Further, should the sensor system 16 be unequipped to provide the controller 28 with the trailer yaw rate $\omega_2$, in another embodiment, at step 144, the instantaneous hitch angle $\gamma$ may still be determined, as follows:

$$\gamma = \sin^{-1}\frac{v_2\omega_1 L \pm v_1\sqrt{v_1^2 + \omega_1^2 L^2 - v_2^2}}{v_1^2 + \omega_1^2 L^2} \text{ or}$$

$$\gamma = \sin^{-1}\frac{v_2}{\sqrt{v_1^2 + \omega_1^2 L^2}} - \tan^{-1}\frac{v_1}{\omega_1 L}.$$

In this equation, the hitch angle $\gamma$ is determined based on the vehicle speed $v_1$, trailer speed $v_2$, and vehicle yaw rate $\omega_1$, whereby such parameters are relied upon more heavily for accuracy. The above equation solving for the hitch angle $\gamma$ is based on a kinematic relationship for the trailer speed $v_2$, which does not incorporate the trailer yaw rate $\omega_2$, as follows:

$$v_2 = v_1 \cos \gamma + L \sin \gamma \omega_1.$$

With this identified relationship, it is conceivable that if the hitch angle is known by another means, such the hitch angle sensor 44, the trailer speed $v_2$ may also be solved for with the above equation.

Also, trailer speed $v_2$ may be determined with the following equation, based on the trail yaw rate $\omega_2$ and the lateral acceleration $a_{y2}$ of the trailer, such as from the trailer yaw rate sensor 25 and the accelerometer 27, respectively.

$$v_2 = \frac{a_{y2}}{\omega_2}$$

Accordingly, when the trailer speed $v_2$ is sensed or otherwise determined from other variables, such as the trail yaw rate $\omega_2$ and the lateral acceleration $a_{y2}$ of the trailer, then the hitch angle $\gamma$ calculation may incorporate this parameter, as follows:

$$\gamma = \sin^{-1}\frac{v_1\omega_2 D + v_2\omega_1 L}{v_1^2 + \omega_1^2 L^2}.$$

Referring again to FIG. 12, at step 146 the presently estimated hitch angle $\gamma$ may be filtered to provide a more accurate estimate. More specifically, the hitch angle $\gamma$ estimated with the hitch angle estimation routine 130 may be less accurate at low vehicle speed $v_1$ when the denominator of the above-noted equations approaches zero. In one embodiment, the hitch angle $\gamma$ may be filtered by using the trailer yaw rate $\omega_2$ and the vehicle yaw rate $\omega_1$. For instance, the estimated hitch angle $\gamma$ could be filtered with a discrete-time Kalman filter, whereby the filtered hitch angle estimate is obtained from the following equation:

$$\hat{\gamma}_{k+1} = \hat{\gamma}_k + (\omega_{2,k} - \omega_{1,k}) \cdot T_s + K_k \cdot (\gamma_k - \hat{\gamma}_k).$$

In this embodiment, $T_s$ is the sampling time, k is an integer representing the $k^{th}$ sampling instance, $K_k$ is the Kalman gain, and $\gamma_k$ is the calculated hitch angle from the above-noted equations.

However, when the vehicle 14 is stopped, the filtered estimate is "frozen" at the previously known good value, i.e.:

$$\hat{\gamma}_k = \hat{\gamma}_k.$$

This is the filter to determine when the vehicle 14 is stopped or traveling at low speeds, as provided at step 148, which precedes step 144. If the vehicle 14 is not determined to be stopped or traveling slow at step 148, the hitch angle $\gamma$ is estimated and filtered at steps 144 and 146, as described above. When the result of an accurate hitch angle $\gamma$ from the above-noted kinematic equations is temporarily not available or inaccurate (e.g., at low speed), the filtered estimate is obtained from the following equation:

$$\hat{\gamma}_k = \hat{\gamma}_k + (\omega_{2,k} - \omega_{1,k}) \cdot T_s.$$

In an additional or alternative embodiment, the hitch angle $\gamma$ may be filtered by using the vehicle yaw rate $\omega_1$ and vehicle speed $v_1$. For instance, this may be desired if the trailer yaw rate $\omega_2$ is noisy, whereby the filtering described above and shown in FIG. 12 may not generate desired results. In this case, the since the diagram illustrated in FIG. 11 is nonlinear, a nonlinear extension of the Kalman filter, which is often referred to as extended Kalman filter by those skilled in the art, may be applied. To do so, when the results are generally available and accurate for the hitch angle $\gamma$ determined at step 144, such as when the vehicle 14 is moving a sufficient speed, the filter hitch angle may be estimated from the following equation:

$$\hat{\gamma}_{k-1} = \hat{y}_k + \left(\frac{v_{1,k}}{D}\sin\hat{\gamma}_k - \frac{\omega_{1,k} \cdot L}{D}\cos\hat{\gamma}_k - \omega_{1,k}\right) \cdot T_s + K_k \cdot (\gamma_k - \hat{\gamma}_k)$$

Accordingly, when the results are temporarily not available or inaccurate for the hitch angle γ determined at step 144, such as at low speeds, the filtered hitch angle estimate may is obtained from the following equation:

$$\hat{\gamma}_{k-1} = \hat{y}_k + \left( \frac{v_{1,k}}{D} \sin \hat{y}_k - \frac{\omega_{1,k} \cdot L}{D} \cos \hat{y}_k - \omega_{1,k} \right) \cdot T_s$$

There are many alternative ways to express the Kalman gain, and one of the formulations is given as follows:

$$A_k = \left( \frac{v_{1,k}}{D} \cos \hat{y}_k + \frac{\omega_{1,k} \cdot L}{D} \sin \hat{y}_k \right) \cdot T_s + 1,$$
$$K_k = P_k (P_k + R)^{-1},$$
$$P_{k-1} = A_k (1 - K_k) P_k A_k^T + Q,$$

where $A_k$ is the derivative matrix, Q is the process noise covariance, R is the measurement noise covariance, and $P_k$ is the estimation error covariance.

As shown in FIG. 12, upon estimating and filtering the hitch angle γ, at step 152 the trailer length D and vehicle wheelbase W can be estimated or refined to improve the accuracy of later calculations. As such, trailer length D may be estimated based on the trailer speed $v_2$, the vehicle speed $v_1$, the vehicle yaw rate $\omega_1$, and the trailer yaw rate $\omega_2$, as determined from the previous steps of the hitch angle estimation routine 130. For instance, if the drawbar length L between hitch point and rear axle of the vehicle 14 is measured or otherwise known, the trailer length D can be calculated as follows:

$$D = \sqrt{\frac{v_1^2 + \omega_1^2 L^2 - v_2^2}{\omega_2^2}}.$$

Similarly, if the trailer length D is measured or otherwise known, the drawbar length L between hitch point and rear axle of the vehicle 14 may be estimated based on the trailer speed $v_2$, the vehicle speed $v_1$, the vehicle yaw rate $\omega_1$, and the trailer yaw rate $\omega_2$, as determined from the previous steps of the hitch angle estimation routine 130. As such, the drawbar length L can be calculated as follows:

$$L = \sqrt{\frac{v_2^2 + \omega_2^2 D^2 - v_1^2}{\omega_1^2}}.$$

As also shown in FIG. 12, at step 154 the hitch angle estimation routine 130 may proceed to estimate or refine the trailer turning radius $r_2$ and the curvature $\kappa_2$ of the trailer trajectory for improving the accuracy of later calculations. This may be done using the following equations:

$$r_2 = \frac{v_2}{\omega_2}, \text{ and}$$
$$\kappa_2 = \frac{\omega_2}{v_2}.$$

Referring again to FIG. 10, at step 160 the hitch angle γ is determined between the vehicle 14 and the trailer 12, although this may be done continuously during operation of the trailer backup assist system 10. It is contemplated that in additional embodiments of the trailer backup assist system 10 that the steps of determining the kinematic relationship and sensing the hitch angle γ may occur before the trailer backup assist system 10 is activated or at any other time before steering commands are generated. Accordingly, at step 162, the position and rate of changes is received from the steering input device 18, such as the angular position and rate of rotation of the rotatable knob 30, for determining the desired curvature 26. At step 164, steering commands may be generate based on the desired curvature, correlating with the position and rate of change of the steering input device 18. The steering commands and actuation commands generated may be generated in conjunction with processing of the curvature routine 98, as previous discussed. At step 166, the steering commands and actuation commands have been executed to guide the trailer 12 on the desired curvature provided by the steering input device 18.

In parallel with performing the operations for receiving the trailer backup assist requests, determining the desired curvature 26 of the trailer 12, and generating the vehicle steering commands, the trailer backup assist system 10 may perform an operation for monitoring if an unacceptable trailer backup condition exists. Examples of such monitoring include, but are not limited to assessing a hitch angle γ to determine if a hitch angle γ threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from the wheel speed information obtained from one or more speed sensors 58 of the vehicle 14. If it is determined that an unacceptable trailer backup condition exists, an operation may be performed for causing the current path of travel of the trailer 12 to be inhibited (e.g., stopping motion of the vehicle 14), followed by the operation being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations. Otherwise, the method can proceed to operation for ending the current trailer backup assist instance. In conjunction with performing the operation for ending the current trailer backup assist instance, an operation can be performed for controlling movement of the vehicle 14 to correct or limit a jackknife condition (e.g., steering the vehicle 14, decelerating the vehicle 14, limiting magnitude and/or rate of driver requested trailer curvature input, limiting magnitude and/or rate of the steering command, and/or the like to preclude the hitch angle from being exceeded).

With the sensor system 16 and/or controller 28 providing the trailer yaw rate $\omega_2$, this parameter may additionally or alternatively be utilized to improve the electronic stability control provided with the power assist steering system 62 when the vehicle 14 is towing a trailer. Some electronic stability control systems use a so called bicycle model (without trailer) to obtain a reference vehicle yaw rate commanded by the driver. However, when the vehicle is towing a trailer, the towing vehicle may exhibit more oversteer or more understeer tendencies during a turn, compared to the same vehicle without a trailer attached. Thus the electronic stability control performance may degrade, and/or unintended activations may occur, when the vehicle is towing a trailer.

By using the sensed or otherwise determined trailer yaw rate signal $\omega_2$, together with other electronic stability control signals, the additional oversteer or understeer tendencies of the vehicle (compared to when not towing a trailer) can be identified. Accordingly, the existing electronic stability control system can be sensitized or desensitized (e.g., by modifying the control thresholds for the brake and engine controllers). The brake and engine control actions can also be increased or reduced by changing the controller gains. Therefore, an additional controller which uses trailer yaw rate signal $\omega_2$ (or the difference between trailer and vehicle yaw rate, i.e., $\omega_2-\omega_1$) and its derivative may be integrated with the existing electronic stability control system. Such a controller is beneficial for improving the overall vehicle-trailer combination stability In addition, it is contemplated that using the trailer yaw rate signal $\omega_2$ and trailer lateral acceleration signal $a_{y2}$, together with other standard electronic stability control signals, may further identify additional oversteer or understeer tendencies of the vehicle. It is also conceivable that a controller that uses the trailer hitch angle γ as a feedback signal may be integrated with the existing electronic stability control system for improving the overall vehicle-trailer combination stability.

As previously mentioned, the hitch angle γ determined by the hitch angle estimation routine 130 may also be used to identify and stabilize a swaying trailer. More specifically, the vehicle-trailer combination becomes less damped when its speed is increased. With any driver inputs or external disturbances, the trailer may start to oscillate and the oscillation may sustain for a long time. If the speed is above certain "critical speed", the system may become unstable, causing the oscillation amplitude to grow larger and eventually cause vehicle instability and/or a jackknife condition. A controller which uses trailer yaw rate signal $\omega_2$ (or the difference between trailer and vehicle yaw rate, i.e., $(\omega_2-\omega_1)$ and its derivative can be designed to actively control the vehicle/trailer to damping out the oscillation. In addition, the trailer yaw rate $\omega_2$ and the trailer lateral acceleration $a_{y2}$, together with other standard electronic stability control signals, may be used to stabilize a swaying trailer. Since both trailer yaw rate signal $\omega_2$ and trailer lateral acceleration signal $a_{y2}$ directly provide information about the trailer motion, they can be used to quickly identify whether the trailer is swaying.

As discussed above, the hitch (trailer) angle γ can be estimated utilizing yaw rate measurements. However, if the vehicle 14 and trailer 12 are stationary, the yaw rate will be zero, and the trailer backup assist system 10 cannot therefore estimate a hitch angle γ utilizing yaw rate measurements when the vehicle 14 and trailer 12 are stationary. The controller 28 of trailer backup assist system 10 may be configured to continuously calculate and update the estimated hitch angle during operation utilizing measured yaw rate data. If the vehicle 14 and trailer 12 stop, the trailer hitch angle γ estimated prior to stopping the vehicle can be stored and reused when the vehicle 14 and trailer 12 begin moving. With reference to FIG. 13, the hitch angle γ can be stored in non-volatile memory if the authentication device 202 changes from a ON state to an OFF state (i.e. a KEY OFF or power off event occurs), and the hitch angle γ can be retrieved at the next KEY ON or power on event (i.e. authentication device 202 changes from an OFF state to an ON state).

Also, the trailer length D and the drawbar length L can be calculated (estimated) utilizing sensor data (e.g. yaw rate data) obtained while the vehicle 14 and trailer 12 are moving as discussed above in connection with FIG. 12. Trailer data (e.g. trailer length D, drawbar length L, etc.) can also be stored in non-volatile memory at the time the vehicle is turned off as indicated by a KEY OFF event. It will be understood that measured trailer data (e.g. trailer length D and drawbar length L) that has been input by a user rather than estimated by system 10 may also be stored when vehicle 14 is turned off, and retrieved when vehicle 14 is turned on.

Referring again to FIG. 13, a system and method 200 for enhanced yaw rate trailer angle detection initialization 200 involves determining if a vehicle is turned on at step 206. Step 206 may include determining if the vehicle ignition is ON based on a signal from the authentication device 202. If the vehicle was turned OFF at step 232 (i.e. a KEY OFF (power off) event occurred), step 206 may include determining if the authentication device 202 has changed from an OFF state to an ON state, thereby defining a KEY ON (power on) event. If the vehicle has not been turned ON at step 206, no action is taken. However, if the vehicle has been turned on, trailer data is retrieved from non-volatile memory as shown at step 208. The retrieved trailer data may comprise unique trailer identification information, vehicle position data, trailer angle γ, trailer length L, hitch location, trailer mileage, and a TrailerConnected Flag as shown at step 234 that had previously been stored as shown at step 234.

It will be understood that the power turned off (step 234) and on (step 206) may comprise only power off/on to system 10, or power off/on may comprise the main power to vehicle 14 being off/on. Typically, power to system 10 is tied directly to main vehicle electrical power such that electrical power is supplied to system 10 when vehicle main power is on, and power is not supplied to system 10 when the vehicle main electrical power is off. However, power could also be supplied to system 10 independently of main vehicle electrical power being on or off At steps 210 and 212, the controller 28 determines if trailer 12 is connected to vehicle 14. As discussed above, this may be accomplished utilizing trailer present sensor 204 (FIG. 2) and/or signals from one or more of sensors 23, 25, and 27 of trailer sensor module 20. If a trailer connection is not detected at step 212, a TrailerConnected Flag is set to FALSE as shown at step 236 and no additional action is taken by the system 10. However, if a trailer connection is detected at step 212, the TrailerConnected Flag is set to TRUE at step 214.

After the TrailerConnected Flag is set to TRU at step 214, the controller 28 of trailer backup assist system 10 compares current trailer identification information to trailer identification information that was previously stored at step 234 when the vehicle was turned off (i.e. a KEY OFF event). The trailer identification information may comprise serial numbers that are unique to one or more of the sensors 23, 25, and 27 of trailer sensor module 20. Alternatively, the trailer identification information may comprise other unique identification information (e.g. a bar code on target 52) that can be utilized by the controller 28 of trailer backup assist system 10 to determine if the trailer 12 that is presently connected to vehicle 14 is identical to the trailer 12 that was present at the time the vehicle was turned off (KEY OFF) at step 232.

If the identification information info is not equal to memory at step 216, trailer setup 238 is initiated. Trailer setup 238 may comprise a process including providing a signal to an operator utilizing screen 82 indicating that trailer 12 must be connected, and that trailer length and other data must be entered or that the vehicle must be driven initially to provide the trailer backup assist system 10 with data that can be utilized to learn (estimate) the trailer length and other parameters.

If the trailer identification information is equal to the stored trailer identification information at step 216, the controller 28 of trailer backup assist system 10 then determines the current (present) vehicle position at step 218. The vehicle position 218 may be determined utilizing a GPS system on vehicle 14. At step 220, The current vehicle position is compared to a prior vehicle position that was stored at step 234 when the vehicle 14 was previously turned off at step 232. At step 220, if the current vehicle position is substantially equal to the stored vehicle position, the trailer hitch angle is initialized as shown at step 222. However, if the controller 28 of system 10 determines at step 220 that the vehicle 14 has moved since the last KEY OFF, trailer setup 238 is initialized. In this way, the controller 28 "assumes" that the trailer angle previously stored at step 238 is no longer accurate if the vehicle has moved as determined at step 220.

If the vehicle 14 has not moved, and if the hitch angle is initialized as shown at step 222, the controller 28 retrieves the trailer data as shown at step 224. The trailer data retrieved at step 224 may correspond to the data stored at step 234, and may include the trailer angle, trailer length, hitch location, and any other data that may be required by trailer backup assist system 10 to begin trailer backup operations. It will be understood that step 224 would not necessarily require retrieving trailer data from non-volatile memory if the trailer data has previously been retrieved. For example, the trailer data may be retrieved prior to step 224, and step 224 may involve an "authorization" to utilize the previously retrieved data during trailer backup operations.

After the trailer data is retrieved at step 224, or after the trailer setup 238 is completed, the trailer backup assist system 10 is activated as shown at step 226. As shown at step 228, if the vehicle 14 is parked, the trailer backup assist system 10 then determines if the trailer is disconnected at step 230. The trailer disconnection of step 230 may be substantially the inverse of the trailer connection determination of step 212, and it may involve determining if sensor 208 has indicated that a trailer 12 is connected. Step 230 may also include determining if controller 28 has established an electrical connection with trailer sensor module 20. If the trailer 12 is disconnected at step 230, the process returns back to step 226. If the trailer is not disconnected at step 230, the process continues to step 232. At step 232, the system determines if the vehicle 14 is turned off. This may involve determining if authentication device 202 is in an OFF state, or if authentication device 202 has changed from an ON state to an OFF state to define a KEY OFF (power off) event. If the vehicle 14 is not parked at step 228, the trailer backup assist system 10 operates to control/assist trailer backup as described in more detail above in connection with FIGS. 1-12.

If the vehicle has been turned off at step 232, the process then continues to step 234. At step 234, trailer data, vehicle position, trailer angle γ, trailer length L, hitch location, trailer mileage, and the TrailerConnected Flag are stored in non-volatile memory. It will be understood that not all of the trailer data shown at step 234 in FIG. 13 would necessarily have to be stored in every case. Alternatively, other data such as a trailer image pattern generated by camera 46 could also be stored.

Figure 13:
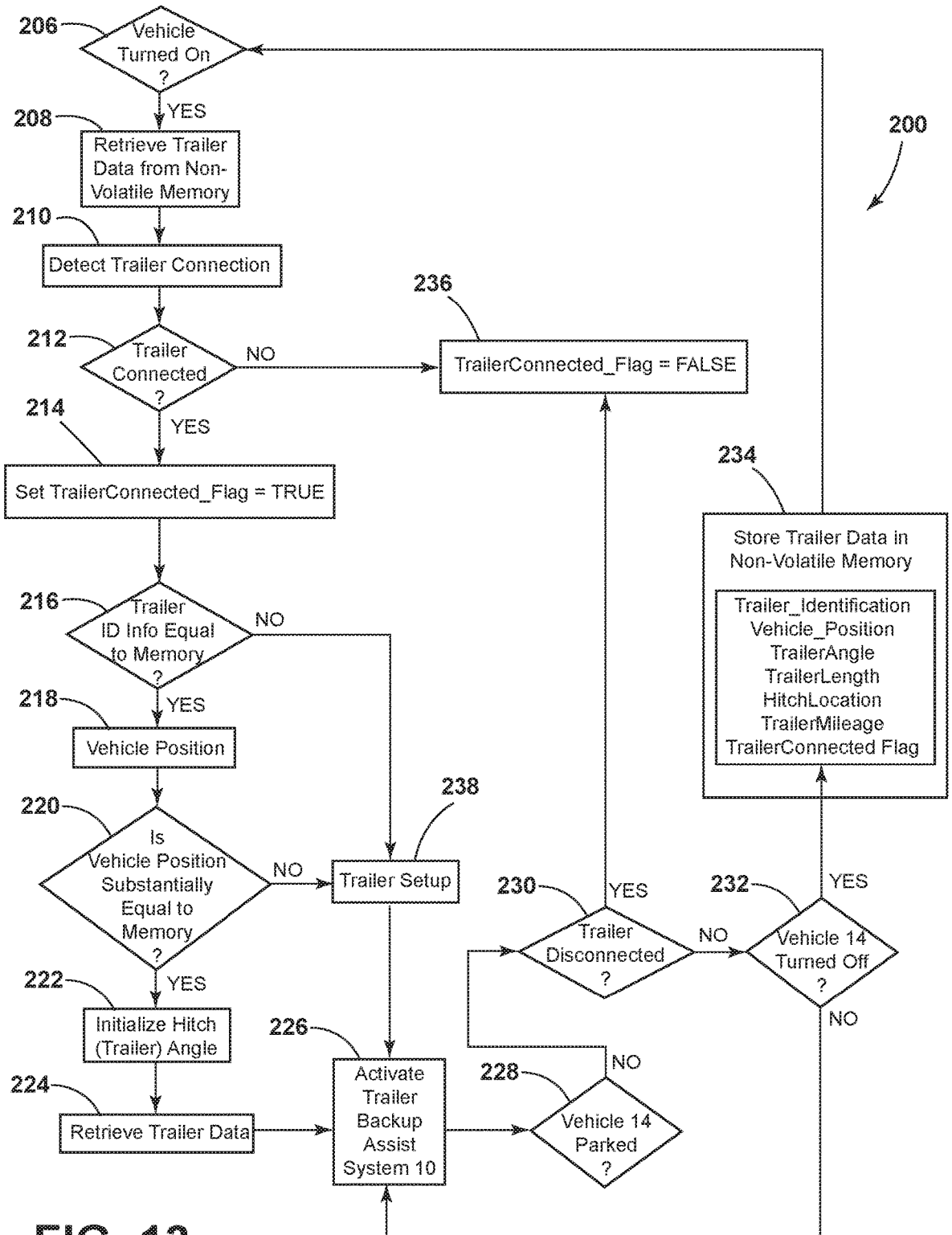
FIG. 13 is a flow diagram illustrating a method of identifying a trailer and estimating a hitch angle at vehicle start-up.

The system and process 200 shown in FIG. 13 solves problems associated with turning a vehicle on and off, disconnecting a trailer, etc. by enabling the trailer backup assist system 10 to determine if a specific trailer has remained connected to vehicle 14 during a period of time in which the vehicle was turned off. The process shown in FIG. 13 solves the problem by storing trailer identification information along with trailer connection state, vehicle position (optional), trailer/hitch angle γ, trailer length L, hitch position (drawbar length L), and trailer image pattern (optional if the vehicle is equipped) when the vehicle is parked and turned off, and comparing these data at KEY ON (power on) to determine if the same trailer 12 is still connected at the same trailer angle γ. In turn, the trailer parameters and trailer angle γ may be available to the trailer backup assist system 10 without the need for trailer setup (step 238) or calibration driving.

As discussed above, a trailer connection (step 212) may be detected when an electrical connection is active between vehicle 14 and trailer 12. As also discussed above, the trailer backup assist system may be configured to retrieve trailer identification information from the last key cycle (i.e. data stored at step 234 when the vehicle is turned off at step 238). Retrieving the trailer identification information may be accomplished by reading a serial number from one or more of the sensors 23, 25, and 27 of trailer sensor module 20 or a unique serial number or other identification data associated with the trailer 12 itself. If the trailer identification information substantially matches the value stored at step 234 by trailer backup assist system 10, the system 10 retrieves the vehicle position as discussed above in connection with step 218. If the trailer 12 has remained connected since the last key cycle and/or the vehicle position has not changed since the last key cycle, the trailer angle γ is also assumed to be unchanged as discussed above in connection with steps 220 and 222 of FIG. 13. In turn, trailer angle detection is initialized at step 226 utilizing the previously-stored trailer hitch angle.

Figure 14:
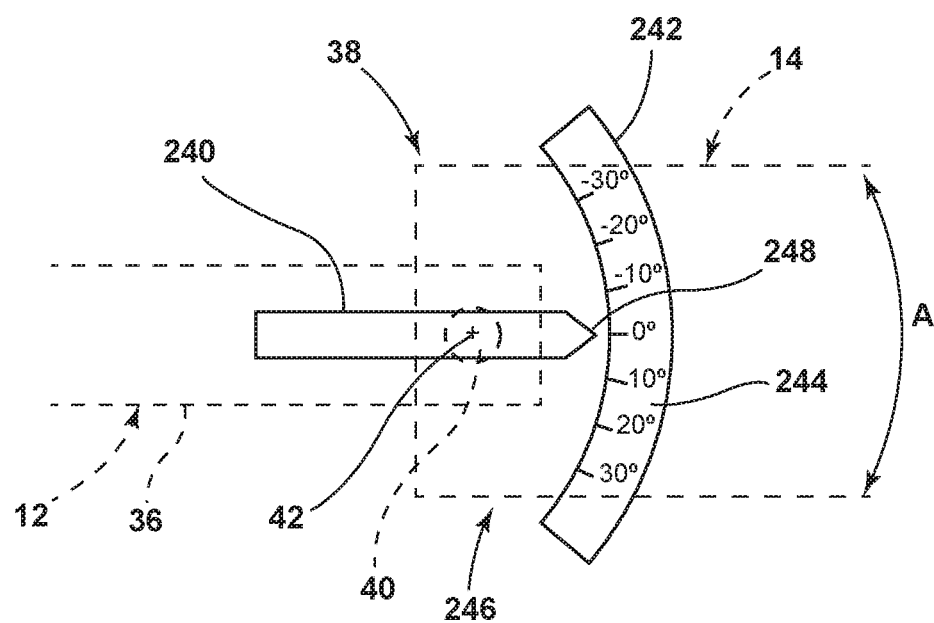
FIG. 14 is a partially fragmentary top plan view of a trailer angle measurement device.

With reference to FIG. 14, an angle measuring device includes an arrow member 240 that may be attached to trailer 12 (or vehicle 14) and an arcuate member 242 that may be attached to vehicle 14 (or trailer 12) to permit a user to visually determine a trailer angle that can be input at step 238 (FIG. 13). Trailer 12 pivots about vertical axis 42 relative to vehicle 14, thereby causing pointed end 248 of arrow member 240 to point at indicia 244 of arcuate member 242. Indicia 244 may comprise angles "10°," "−10°," etc. to thereby permit a user to readily determine (measure) an initial trailer angle that can be input prior to use of system 10 if the vehicle has moved (step 220) such that a stored trailer angle (step 234) cannot be retrieved at steps 222 and 224. Arrow member 240 and arcuate member 242 may be made from sheets of polymer or other suitable material, and may be attached to trailer 12 and vehicle 14 utilizing adhesive, mechanical fasteners, or other suitable connectors.

With reference to FIGS. 15A-15E, sensor data (e.g. from trailer yaw rate sensor 25) may be compared to expected sensor data (predefined validity criteria) to determine if trailer sensor module 20 is installed on trailer 12 at an improper orientation. As discussed in more detail below in connection with FIG. 15B, if the trailer sensor module 20 is mounted to a side surface 36B (FIG. 1A) of trailer tongue 36 (i.e. 90° from proper orientation), the data from trailer yaw rate sensor 25 will be outside of an expected range of data output. Similarly, with reference to FIG. 15C, if the trailer sensor module 20 (trailer yaw rate sensor 25) is mounted upside down (i.e. 180° from proper orientation), the data from trailer yaw rate sensor 25 will be outside an expected range.

FIGS. 15A-15E are examples of trailer and vehicle yaw rate measurements during operation of vehicle 14 with trailer 12 attached while the vehicle 14 is moving in a forward direction. Yaw sensor criteria may be utilized in combination with inclinometer 29. Alternatively, if the trailer sensor module 20 does not include an inclinometer 29, yaw sensor criteria may be utilized to determine if sensors 20 are not properly installed on trailer 12.

Figure 15A:
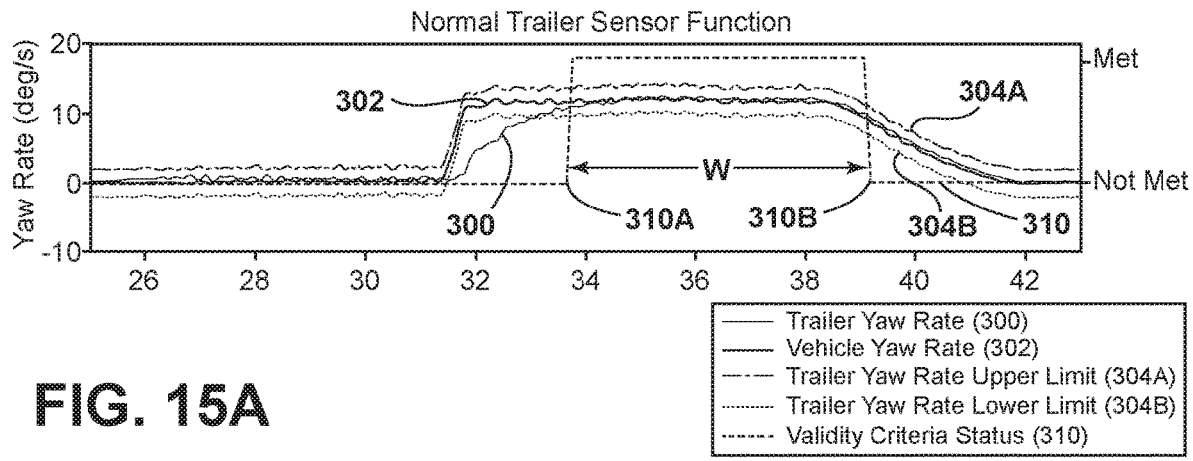
FIG. 15A is a plot showing sensor data for normal trailer sensor function.
Figure 15B:
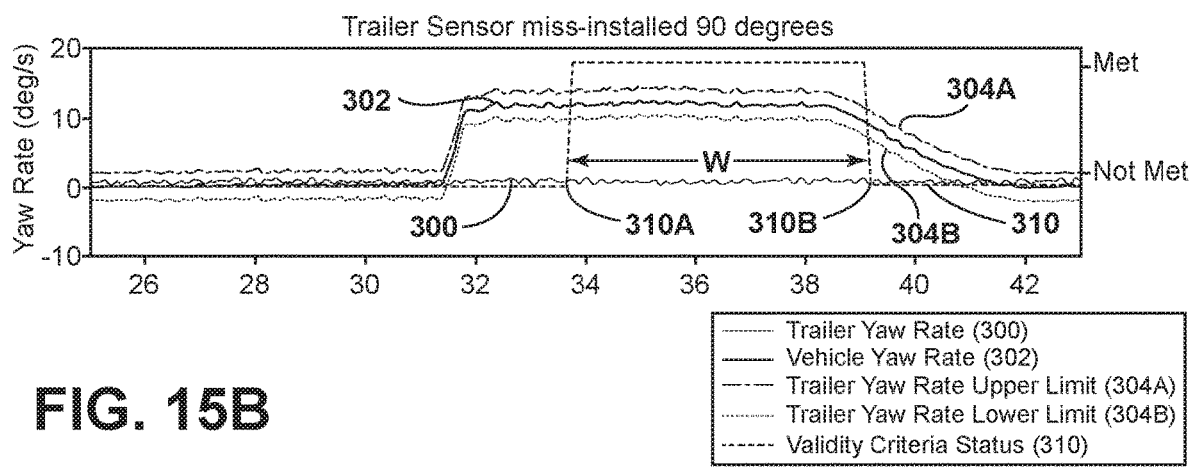
FIG. 15B is a plot showing sensor data when a trailer sensor is miss-installed 90°.
Figure 15C:
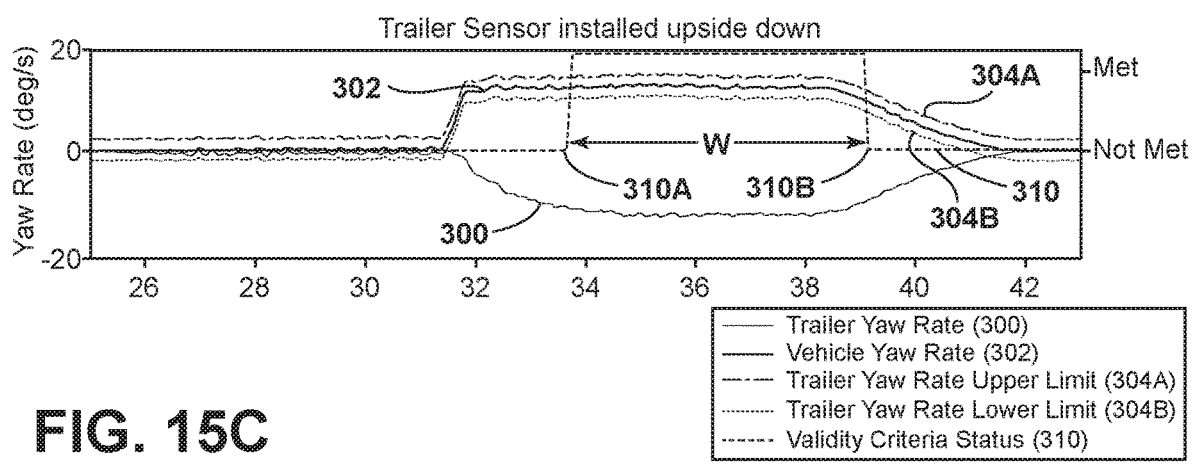
FIG. 15C is a plot showing sensor data when a trailer sensor is installed upside down.
Figure 15D:
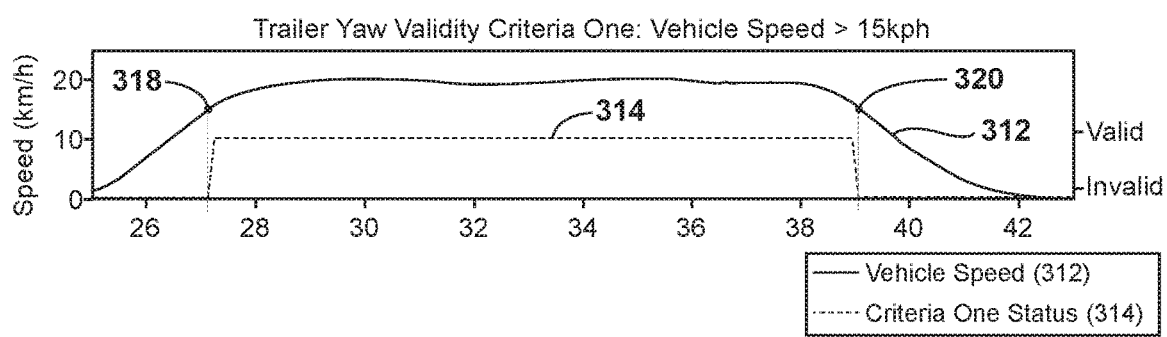
FIG. 15D is a plot showing a first trailer yaw validity criteria involving vehicle speed.
Figure 15E:
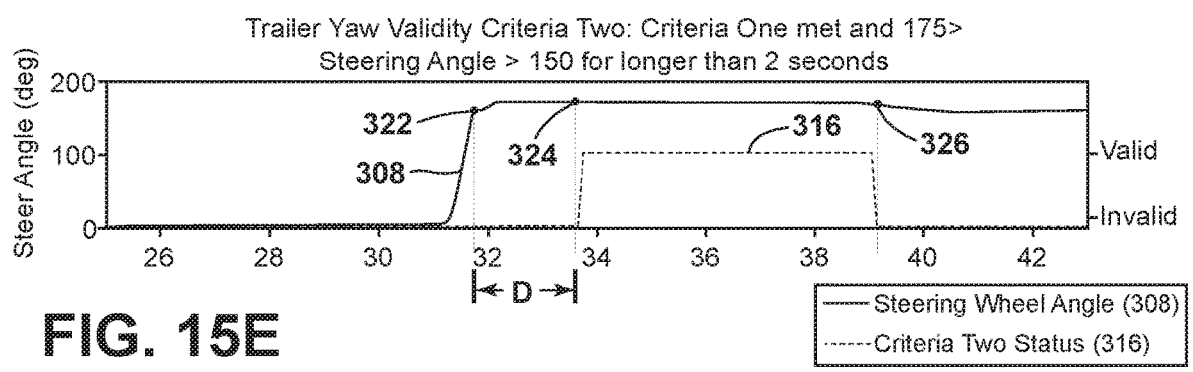
FIG. 15E is a plot showing a second validity criteria involving steering angle.

In FIGS. 15A-15E, the horizontal axis represents time (in seconds). It will be understood that the times 26 seconds, 28 seconds, etc. are merely examples of a possible operating scenario. FIGS. 15D and 15E show possible vehicle operating parameters during which sensor data from trailer yaw rate sensor 25 may be compared to expected sensor data. For example, if vehicle 14 is stationary, the yaw rate data from trailer yaw rate sensor 25 will generally be zero regardless of the orientation of trailer yaw rate sensor 25. Because the expected yaw rate data is zero when the vehicle is stationary, a comparison between measured data and expected data is preferably made when the vehicle operating parameters will cause expected yaw rate data that is significantly different than yaw rate data from trailer yaw rate sensor 25 if the trailer sensor module 20 (trailer yaw rate sensor 25) is improperly mounted to trailer 12 at an improper inclination.

The data and times of FIGS. 15A-15C are all based on the same vehicle speeds (FIG. 15D) and steering (FIG. 15E). Also, the validity criteria of FIGS. 15D and 15E result in the same comparison "window" W and the same expected sensor data in FIGS. 15A-15C. However, different orientation of the trailer sensor module 20 (trailer yaw rate sensor 25) results in different sensor data from trailer yaw rate sensor 25 as shown in FIGS. 15A-15C. In FIGS. 15A-15C, measured vehicle yaw rate data is used to generate validity criteria for measured trailer yaw rate data. However, the validity criteria may be determined based on other sensor data.

Referring again to FIG. 15A, during normal trailer sensor function, trailer yaw rate 300 is generally similar to vehicle yaw rate 302. However, as the vehicle 14 initially turns (at about 31-32 seconds) as shown by the steering angle 308 (FIG. 15E), the trailer yaw rate 300 will lag vehicle yaw rate 302. In the example of FIG. 15A, the measured trailer yaw rate 300 meets the validity criteria if the measured trailer yaw rate 300 falls between trailer yaw rate upper limit 304A and trailer yaw rate lower limit 304B. The window "W" comprises a time period between leading validity criteria line section 310A and trailing validity criteria line section 310B. In the illustrated example, the trailer yaw rate upper limit 304A and lower limit 304B comprises the vehicle yaw rate 302 plus and minus a percentage (e.g. 10%, 20%, 30%, etc.). However, it will be understood that this validity criteria (upper and lower limits 304A and 304B) are merely examples of one possible criteria, and the present disclosure is not limited to the specific example of FIGS. 15A-15E. For example, the upper and lower limits could comprise vehicle yaw rate plus and minus a fixed (constant) amount rather than a percentage.

With reference to FIG. 15D, validity Criteria One involves vehicle speed. For example, the system 10 may be configured to monitor vehicle speed and set a flag equal to "true" (or "met") if vehicle speed 312 exceeds 15 kph. In the example of FIG. 15D, the vehicle speed 312 exceeds 15 kph at a point 318 at about 27 seconds, and the vehicle speed drops below 15 kph at point 320 at about 39 seconds. The speed criteria 314 is therefore set as true/met during the time interval between points 318 and 320. Criteria Two is set to false (or not met) at point 320 when the vehicle speed reaches and drops below 15 kph. It will be understood that the vehicle speed (line 312) of FIG. 15D is merely an example of a possible (forward) vehicle speed that could occur during operation.

With further reference to FIG. 15E, Criteria Two may comprise steering angle 308. In the illustrated example, the steering criteria comprises a steering angle that is less than 175°, and greater than 150. The steering angle 308 initially exceeds 150 at point 322. However, in the illustrated example, Criteria Two (steering) is not "true" (or met) for a delay "D" of about two seconds corresponding to point 324. As noted above in connection with FIG. 15A, the trailer yaw rate 300 generally lags the vehicle yaw rate 302 as vehicle 14 initially begins to turn. Because the vehicle yaw rate 302 is utilized as the criteria to determine if yaw rate sensor 25 is properly oriented, a delay D (e.g. about two seconds) is utilized before steering criteria 316 has a true/met state. It will be understood that the delay "D" could be larger or smaller than two seconds (e.g. zero, four seconds, six seconds, eight seconds, or more). In the example of FIG. 15E, the steering criteria 316 changes to a false/not met criteria at point 326. In the illustrated example, the speed criteria 316 is only true/met if vehicle speed criteria 314 (FIG. 15D) is simultaneously true/met. Thus, although the steering angle remains between 150° and 175° at 0.326 (FIG. 15E), the steering criteria 316 nevertheless switches to false/not met at a time of about 39 seconds because the vehicle speed drops below 15 kph at about 39 seconds as shown in FIG. 15D. As discussed above, the vehicle speed and steering wheel angles of FIGS. 15D and 15E are merely examples of a possible operating scenario, and the present disclosure is not limited to any specific vehicle speed, steering angle, or other operating condition. Similarly, operating criteria other than Criteria One and/or Criteria Two may be utilized, and the present application is not limited to the specific criteria of FIGS. 15D and 15E.

Referring again to FIG. 15A, during the criteria met window "W", Criteria One and Criteria Two are true/met if the trailer yaw rate sensor 25 is mounted properly and operating properly, the trailer yaw rate data 300 will fall between the upper and lower yaw rate validity limits 304A and 304B during window W. However, with reference to FIG. 15B, if the trailer yaw rate sensor 25 is installed at 90° relative to the proper orientation (e.g. the sensor module 20A is mounted to a vertical side surface 36B (FIG. 1A) of trailer tongue 36, the trailer yaw rate data 300 will fall outside of the trailer yaw rate lower validity limit 304B. With further reference to FIG. 15C, if the trailer yaw rate sensor 25 is installed upside down, the measured trailer yaw rate 300 will tend to dip below 0° during the window W, outside the trailer yaw rate lower validity limit 304B. It will be understood that FIGS. 15B and 15C are merely examples of improperly installed sensor configurations providing trailer yaw rate sensing data that falls well outside of a plausible or accepted range. If, for example, trailer yaw rate sensor 25 is installed at 10° or 20° from horizontal, the trailer yaw rate data 300 may be outside validity limits 304A and/or 304B.

In general, the trailer yaw rate sensor-based approach (e.g. FIGS. 15A-15E) may be utilized at step 135 (FIG. 10) to determine if the yaw rate sensor 25 is at a proper orientation. If the yaw rate sensor 25 is not at a proper orientation, the system may display an orientation error as shown at step 137 of FIG. 10.

Sensing validity criteria (e.g. the criteria discussed above in connection with FIGS. 15A-15E) may be utilized if trailer sensor module 20 does not include an inclinometer 29. Alternatively, sensing criteria could also be utilized if the sensor module 20 does include an inclinometer 29. For example, if the inclinometer 29 provides data indicating that the trailer sensor module 20 is properly mounted, but sensing criteria (e.g. FIGS. 15A-15E) indicate that the trailer sensor module 20 is not properly mounted within predefined tolerances, the system 10 may be configured to determine that the inclinometer 29 is generating inaccurate data. Step 137 may optionally include displaying a message indicating that the inclinometer 29 is generating inaccurate data and/or a message such as "check trailer sensor module". It will be understood that if the trailer sensor module 20 includes an inclinometer 29, the inclinometer 29 may be utilized exclusively, without use of the sensing criteria of FIGS. 15A-15E or other such sensor/measurement-based criteria.

If the trailer sensor module 20 includes an inclinometer 29, a single trailer sensor module 20 can be utilized in connection with various different trailers 12 by moving the sensor module 20 from one trailer to another as required. If the trailer sensor module 20 does not include an inclinometer 29, a sensor-based criteria (e.g. FIGS. 15A-15E) may be utilized to determine if the sensor module 20 is improperly mounted on trailer 12. However, the sensor-based criteria of FIGS. 15A-15E is less accurate than inclinometer measurements, and the measurement-based criteria of FIGS. 15A-15E may therefore be unable to detect small errors (e.g. 10° or 20°) with respect to the orientation of trailer sensor module 20.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A trailer backup assist system comprising:
  a trailer sensor module configured to be mounted to a trailer, the trailer sensor module including a module structure, and a yaw rate sensor and an inclinometer mounted to the module structure whereby the yaw rate sensor and the inclinometer move together with the module structure;
  a controller configured to:
  utilize data from the yaw rate sensor to generate vehicle control signals to control at least one of a vehicle speed and vehicle direction while a vehicle is backing up with the trailer attached thereto;
  utilize data from the inclinometer to determine if the trailer sensor module is properly mounted to a trailer within a predefined tolerance; and
  generate a signal to a Human Machine Interface (HMI) indicating that an orientation of the trailer sensor module on a trailer is not proper if the trailer sensor module is mounted on a trailer outside of the predefined tolerance.

2. The trailer backup assist system of claim 1, wherein:
  the yaw rate sensor comprises a camera.

3. The trailer backup assist system of claim 1, wherein:
  the yaw rate sensor comprises a piezoelectric device.

4. The trailer backup assist system of claim 1, wherein:
  the trailer backup assist system is configured to calculate a hitch angle utilizing data from the yaw rate sensor.

5. The vehicle of claim 1, wherein:
  the controller is configured to store unique trailer identification information prior to a power off event and to retrieve stored unique trailer identification information after a power on event to thereby determine if a trailer detected after a power on event is a different trailer than a trailer connected prior to a power off event.

6. A vehicle, comprising:
  a trailer backup assist system having a controller configured to:

determine an incline of a yaw rate sensor mounted to a trailer utilizing data from an inclinometer mounted to the trailer;

generate a signal to an HMI of the vehicle to inform a user of the incline and adjustments required for proper incline;

estimate a hitch angle using yaw rate data.

7. The vehicle of claim 6, wherein:
the yaw rate sensor and the inclinometer form a trailer sensor module.

8. The vehicle of claim 7, wherein:
the trailer sensor module includes a magnet configured to retain the trailer sensor module on a trailer.

9. The vehicle of claim 7, wherein:
the controller is configured to generate a signal to the HMI and cause the HMI to provide instructions to correct an orientation of the trailer sensor module if the trailer sensor module is mounted to a trailer at an orientation that is outside of predefined tolerance criteria.

10. The vehicle of claim 7, wherein:
the controller is configured to generate an orientation error message if the trailer sensor module is mounted to the trailer at an orientation that is outside of predefined tolerance criteria.

11. A trailer backup assist system comprising:
a trailer sensor module configured to be mounted to a trailer, the trailer sensor module including a yaw rate sensor;
a controller configured to:
utilize data from the yaw rate sensor to generate vehicle control signals to control at least one of a vehicle speed and vehicle direction while a vehicle is backing up with the trailer attached thereto;
determine if yaw rate data from the yaw rate sensor meets validity criteria; and
generate a signal to a Human Machine Interface (HMI) concerning an orientation of the yaw rate sensor on the trailer if the yaw rate data does not meet the validity criteria.

12. The trailer backup assist system of claim 11, wherein:
the validity criteria comprises an acceptable range of yaw rate data.

13. The trailer backup assist system of claim 12, wherein:
the controller is configured to determine if yaw rate data from the yaw rate sensor meets validity criteria while the vehicle is moving.

14. The trailer backup assist system of claim 11, wherein:
the controller is configured to determine if yaw rate data from the yaw rate sensor meets validity criteria when at least one predefined vehicle operating condition is met.

15. The vehicle of claim 14, wherein:
the at least one predefined vehicle operating condition comprises one or more of vehicle speed and vehicle steering angle.

16. The vehicle of claim 15, wherein:
the at least one predefined vehicle operating condition comprises one or more of a minimum vehicle speed and a predefined range of vehicle steering angles.

17. The vehicle of claim 16, wherein:
the at least one predefined vehicle operating condition comprises a minimum vehicle speed and a predefined range of vehicle steering angles.

18. The vehicle of claim 17, wherein:
the acceptable range of yaw rate data comprises a range defined about vehicle yaw rate.

19. The vehicle of claim 16, wherein:
the vehicle steering angle criteria includes a predefined time delay in addition to a predefined range of steering angles such that the vehicle steering angle criteria is only met if the vehicle steering angle is within the predefined range of steering angles for time equal to or greater than the predefined time delay.

20. The vehicle of claim 11, wherein;
the trailer sensor module further includes an inclinometer; and
the controller is configured to utilize data from the inclinometer to determine if an orientation of the trailer sensor module, when mounted to the trailer, is within predefined orientation tolerance limits.

* * * * *